(12) United States Patent
Kabe et al.

(10) Patent No.: US 12,071,576 B2
(45) Date of Patent: Aug. 27, 2024

(54) COMPOSITION, ORGANIC PHOTOSTIMULATED LUMINESCENT DEVICE, LUMINESCENT METHOD AND METHOD FOR DESIGNING COMPOSITION FOR PHOTOSTIMULATED LUMINESCENCE

(71) Applicant: Okinawa Institute of Science and Technology School Corporation, Okinawa (JP)

(72) Inventors: Ryota Kabe, Okinawa (JP); Takashi Tachikawa, Kobe (JP)

(73) Assignee: OKINAWA INSTITUTE OF SCIENCE AND TECHNOLOGY SCHOOL CORPORATION, Okinawa (JP)

(*) Notice: Subject to any disclaimer, the term of this patent is extended or adjusted under 35 U.S.C. 154(b) by 312 days.

(21) Appl. No.: 17/475,718

(22) Filed: Sep. 15, 2021

(65) Prior Publication Data

US 2022/0119702 A1 Apr. 21, 2022

(30) Foreign Application Priority Data

Sep. 15, 2020 (JP) ................. 2020-154297

(51) Int. Cl.
C09K 11/06 (2006.01)
(52) U.S. Cl.
CPC .................... C09K 11/06 (2013.01)
(58) Field of Classification Search
CPC ............... C09K 11/06; G09F 13/20
See application file for complete search history.

(56) References Cited

U.S. PATENT DOCUMENTS

| 8,236,199 B2* | 8/2012 | Mahany | C09K 11/02 252/301.36 |
| 11,672,136 B2* | 6/2023 | Ohsawa | H10K 50/15 257/40 |

(Continued)

OTHER PUBLICATIONS

Irie, M., Fukaminato, T., Matsuda, K. & Kobatake, S., "Photochromism of Diarylethene Molecules and Crystals: Memories, Switches, and Actuators", Chem. Rev. vol. 114, pp. 12174-12277 (2014).

(Continued)

Primary Examiner — David P Porta
Assistant Examiner — Fani Polyzos Boosalis
(74) Attorney, Agent, or Firm — BROWDY AND NEIMARK, PLLC

(57) ABSTRACT

Photostimulated luminescence, which allows energy or data to be stored and released using electromagnetic waves as both the input and output, has attracted considerable interest in the fields of biomedical and informatics technologies, but this phenomenon is mostly limited to solid inorganic materials. Here, we report photostimulated luminescence from purely organic blend films composed of electron donor, acceptor, and trap/emitter molecules. In the films, charges are accumulated as radical ions by ultraviolet light irradiation and then extracted by near infrared light irradiation to produce visible light. Films are capable of multiple cycles (>10 times) of organic photostimulated luminescence, which was still observable from films left in the dark at room temperature for one week after excitation, and emission color could be varied by changing the trap/emitter molecules. These findings will broadly impact existing applications and provide new prospects for innovative flexible devices.

8 Claims, 11 Drawing Sheets

(56) References Cited

U.S. PATENT DOCUMENTS

| | | | | |
|---|---|---|---|---|
| 2015/0069352 | A1* | 3/2015 | Kim | H10K 50/16 |
| | | | | 257/40 |
| 2018/0346807 | A1* | 12/2018 | Kabe | C09K 11/06 |
| 2020/0165516 | A1* | 5/2020 | Kabe | C09D 11/50 |

OTHER PUBLICATIONS

Hosono, N. & Kitagawa, S., "Modular Design of Porous Soft Materials via Self-Organization of Metal-Organic Cages", Acc. Chem. Res. vol. 51, pp. 2437-2446 (2018).

Green, M.A., Ho-Baillie, A. & Snaith, H.J., "The emergence of perovskite solar cells." Nat. Photonics vol. 8, pp. 506-514 (2014).

Xing, G. et al., "Low-Temperature Solution-Processed Wavelength-Tunable Perovskites for Lasing." Nat. Mater. vol. 13, pp. 476-480 (2014).

Kabe, R. & Adachi, C., "Organic long persistent luminescence," Nature 550, pp. 384-387 (2017).

Jinnai, K., Kabe, R. & Adachi, C. "Wide-Range Tuning and Enhancement of Organic Long-Persistent Luminescence Using Emitter Dopants", Adv. Mater. 30, e1800365 (2018).

Lin, Z., Kabe, R., Nishimura, N., Jinnai, K. & Adachi, C., "Organic Long-Persistent Luminescence from a Flexible and Transparent Doped Polymer," Adv. Mater. 30, 1803713 (2018).

Lin, Z., Kabe, R., Wang, K. & Adachi, C., "Influence of energy gap between chargetransfer and locally excited states on organic long persistence luminescence" Nat. Commun. 11, 191 (2020).

Nishimura, N., Lin, Z., Jinnai, K., Kabe, R. & Adachi, C. "Many Exciplex Systems Exhibit Organic Long-Persistent Luminescence", Adv. Funct. Mater. 30, 2000795 (2020).

Alam, P. et al. "Two Are Better Than One: A Design Principle for Ultralong-Persistent Luminescence of Pure Organics", Adv. Mater. 32, 2001026 (2020).

Jinnai, K., Nishimura, N., Kabe, R. & Adachi, C., "Fabrication-method Independence of Organic Long-persistent Luminescence Performance," Chem. Lett. 48, pp. 270-273 (2019).

Saeki, A., Seki, S., Takenobu, T., Iwasa, Y. & Tagawa, S., "Mobility and dynamics of charge carriers in rubrene single crystals studied by flash-photolysis microwave conductivity and optical spectroscopy", Adv. Mater. 20, pp. 920-923 (2008).

Matsushima, T. et al. "Interfacial charge transfer and charge generation in organic electronic devices", Org. Electron. 12, pp. 520-528 (2011).

Gosztola, D., Niemczyk, M.P., Svec, W., Lukas, A.S. & Wasielewski, M.R., "Excite Doublet States of Electrochemically Generated Aromatic Imide and Diimide Radical Anions," J. Phys. Chem. A 104, pp. 6545-6551 (2000).

Baniya, S. et al., "Magnetic field effect in organic light-emitting diodes based on electron donor-acceptor exciplex chromophores doped with fluorescent emitters," Adv. Funct. Mater. 26, pp. 6930-6937 (2016).

Basel, T. et al., "Magnetic Field Enhancement of Organic Light-Emitting Diodes Based on Electron Donor-Acceptor Exciplex", Adv. Electron. Mater. 2, 1500248 (2016).

Crooker, S.A. et al., "Spectrally resolved hyperfine interactions between polaron and nuclear spins in organic light emitting diodes: Magneto-electroluminescence studies", Appl. Phys. Lett. 105, 153304 (2014).

* cited by examiner

TPBi
(Donor)

TPP+
(Acceptor)

TCTA
(Trap/emitter)

COMPOSITION, ORGANIC PHOTOSTIMULATED LUMINESCENT DEVICE, LUMINESCENT METHOD AND METHOD FOR DESIGNING COMPOSITION FOR PHOTOSTIMULATED LUMINESCENCE

CROSS-REFERENCE TO RELATED APPLICATION

This application claims the benefit of priority from Japanese Application No. 2020-154297, filed Sep. 15, 2021, the disclosure of which application is incorporated by reference herein in its entirety.

FIELD OF THE INVENTION

The present invention relates to organic photostimulated luminance. Particularly, the present invention relates to a composition, use of the composition, an organic photostimulated luminescent device, use of the device, a method for designing a composition for photostimulated luminescence and a program for designing a composition.

BACKGROUND ART

Organic semiconductors[1-4] and some sort of soft crystals[5] (e.g., photochromic compounds,[6] porous coordination polymers/metal-organic frameworks,[7] and metal halide perovskites[8,9]) are promising materials for future technologies such as wearable optoelectronic devices and ultrahigh density data storages owing to their structural diversity, mechanical elasticity, low cost, and facile processing. In addition, optical and electronic properties of these materials can be tailored through molecular design to yield efficient light emission or electric power conversion with tunable band gap energies.

Recently, organic long persistent luminescence (LPL) systems consisting of two or more organic compounds have been demonstrated by retaining long-lived charge-separated states in the blend films over periods of up to an hour at room temperature.[10,11] These new systems are free from rare metals and can be fabricated via the simple melt-casting method at relatively low temperatures. After these pioneering works, a variety of organic LPL materials have been developed by combining different electron donor/acceptor pairs.[12-15] On the other hand, conventional rare metal-based LPL systems are known to exhibit intense photostimulated luminescence (PSL) phenomena in which excess charges accumulated at defects or dopant sites during pre-illumination (e.g., X-ray) cannot be thermally activated at room temperature, but be released by second illumination (e.g., visible light) to emit photons.[16-19] Inorganic PSL materials have been thus used for various applications including optical storages that encode and decode the data (e.g., BaFBr.Eu$^{2+}$ imaging plate)[20,21] and luminescence probes.[22,23] If the PSL is realized with organic materials, new fields of flexible optoelectronic devices and biomedical applications will be opened. The object of the invention is to realize PSL with organic materials.

Non-Patent Literature

1. Xu, J. & Tanabe, S. Persistent luminescence instead of phosphorescence: History, mechanism, and perspective. *J. Lumin.* 206, 581-620 (2019).
2. Lakshmanan, A. R. Radiation-induced defects and photostimulated luminescence process in BaFBr.Eu$^{2+}$. *Phys. Status Solidi A* 163. 3-27 (1996).
3. Rodriguez Burbano, D. C., Rodriguez, E. M., Dorenbos, P., Bettinelli, M. & Capobianco, J. A. The near-IR photostimulated luminescence of CaS:Eu$^{2+}$/Dy$^{3+}$ nanophosphors. *J. Mater. Chem. C* 2, 228-231 (2014).
4. Zhuang, Y., Katayama, Y., Ueda, J. & Tanabe, S. A brief review on red to near-infrared persistent luminescence in transition-metal-activated phosphors. *Opt. Mater.* 36, 1907-1912 (2014).
5. Cho, J. H. et al. Printable ion-gel gate dielectrics for low-voltage polymer thin-film transistors on plastic. *Nat. Mater.* 7, 900-906 (2008).
6. Yan, H. et al. A high-mobility electron-transporting polymer for printed transistors. *Nature* 467, 679-686 (2009).
7. Sekitani, T., Zschieschang, U., Klauk, H. & Someya, T. Flexible organic transistors and circuits with extreme bending stability. *Nat. Mater.* 9, 1015-1022 (2010).
8. Kaltenbrunner, M. et al. An ultra-lightweight design for imperceptible plastic electronics. *Nature* 499, 458-463 (2013).
9. Kato, M., I to, H., Hasegawa, M. & Ishii, K. Soft Crystals: Flexible Response Systems with High Structural Order. *Chem.-Eur. J.* 25, 5105-5112 (2019).
10. Irie, M., Fukaminato, T., Matsuda, K. & Kobatake, S. Photochromism of Diarylethene Molecules and Crystals: Memories, Switches, and Actuators. *Chem. Rev.* 114, 12174-12277 (2014).
11. Hosono, N. & Kitagawa, S. Modular Design of Porous Soft Materials via Self-Organization of Metal-Organic Cages. *Acc. Chem. Res.* 51, 2437-2446 (2018).
12. Green, M. A., Ho-Baillie, A. & Snaith, H. J. The emergence of perovskite solar cells. *Nat. Photonics* 8, 506-514 (2014).
13. Xing, G. et al. Low-Temperature Solution-Processed Wavelength-Tunable Perovskites for Lasing. *Nat. Mater.* 13, 476-480 (2014).
14. Kabe, R. & Adachi, C. Organic long persistent luminescence. *Nature* 550, 384-387 (2017).
15. Jinnai, K., Kabe, R. & Adachi, C. Wide-Range Tuning and Enhancement of Organic Long-Persistent Luminescence Using Emitter Dopants. *Adv. Mater.* 30, e1800365 (2018).
16. Lin, Z., Kabe, R., Nishimura, N., Jinnai, K. & Adachi, C. Organic Long-Persistent Luminescence from a Flexible and Transparent Doped Polymer. *Adv. Mater.* 30, 1803713 (2018).
17. Lin, Z., Kabe, R., Wang, K. & Adachi, C. Influence of energy gap between charge-transfer and locally excited states on organic long persistence luminescence. *Nat. Commun.* 11, 191 (2020).
18. Nishimura, N., Lin, Z., Jinnai, K., Kabe, R. & Adachi, C. Many Exciplex Systems Exhibit Organic Long-Persistent Luminescence. *Adv. Funct. Mater.* 30, 2000795 (2020).
19. Alam, P. et al. Two Are Better Than One: A Design Principle for Ultralong-Persistent Luminescence of Pure Organics. *Adv. Mater.* 32, 2001026 (2020).
20. Jinnai, K., Nishimura, N., Kabe, R. & Adachi, C. Fabrication-method Independence of Organic Long-persistent Luminescence Performance. *Chem. Lett.* 48, 270-273 (2019).
21. Saeki, A., Seki, S., Takenobu, T., Iwasa, Y. & Tagawa, S. Mobility and dynamics of charge carriers in rubrene single crystals studied by flash-photolysis microwave conductivity and optical spectroscopy. *Adv. Mater.* 20, 920-923 (2008).
22. Matsushima, T. et al. Interfacial charge transfer and charge generation in organic electronic devices. *Org. Electron.* 12, 520-528 (2011).
23. Gosztola, D., Niemczyk, M. P., Svec, W., Lukas, A. S. & Wasielewski, M. R. Excited Doublet States of Electrochemically Generated Aromatic Imide and Diimide Radical Anions. *J. Phys. Chem. A* 104, 6545-6551 (2000).
24. Fujitsuka, M. & Majima, T. Reaction dynamics of excited radical ions revealed by femtosecond laser flash photolysis. *J. Photochem. Photobiol., C* 35, 25-37 (2018).
25. Ghosh, I., Ghosh, T., Bardagi, J. I. & Koenig, B. Reduction of aryl halides by consecutive visible light-induced electron transfer processes. *Science* 346, 725-728 (2014).
26. Zeman, C. J., Kim, S., Zhang, F. & Schanze, K. S. Direct Observation of the Reduction of Aryl Halides by a Photoexcited Perylene Diimide Radical Anion. *J. Am. Chem. Soc.* 142, 2204-2207 (2020).
27. Karabunarliev, S., Gherghel, L., Koch, K.-H. & Baumgarten, M. Structure and optical absorption of oligorylenes upon doping. *Chem. Phys.* 189, 53-65 (1994).
28. Sakurai, M., Kobori, Y. & Tachikawa, T. Structural Dynamics of Lipid Bilayer Membranes Explored by Magnetic Field Effect Based Fluorescence Microscopy. *J. Phys. Chem. B* 123, 10896-10902 (2019).
29. Baniya, S. et al. Magnetic field effect in organic light-emitting diodes based on electron donor-acceptor exciplex chromophores doped with fluorescent emitters. *Adv. Funct. Mater.* 26, 6930-6937 (2016).
30. Basel, T. et al. Magnetic Field Enhancement of Organic Light-Emitting Diodes Based on Electron Donor-Acceptor Exciplex. *Adv. Electron. Mater.* 2, 1500248 (2016).
31. Crooker, S. A. et al. Spectrally resolved hyperfine interactions between polaron and nuclear spins in organic light emitting diodes: Magneto-electroluminescence studies. *Appl. Phys. Lett.* 105, 153304 (2014).
32. Peng, Q. et al. Evidence of the Reverse Intersystem Crossing in Intra-Molecular Charge-Transfer Fluorescence-Based Organic Light-Emitting Devices Through Magneto-Electroluminescence Measurements. *Adv. Opt. Mater.* 1, 362-366 (2013).
33. Zhang, C. et al. Magnetic Field Effects in Hybrid Perovskite Devices. *Nat. Phys.* 11, 427-434 (2015).
34. Woodward, J. R. Radical pairs in solution. *Prog. React. Kinet. Mech.* 27, 165-207 (2002).
35. Wolf, S. A. et al. Spintronics: A spin-based electronics vision for the future. *Science* 294, 1488-1495 (2001).
36. Ratera, I. & Veciana, J. Playing with organic radicals as building blocks for functional molecular materials. *Chem. Soc. Rev.* 41, 303-349 (2012).
37. Fan, C. et al. Dibenzothiophene-Based Phosphine Oxide Host and Electron-Transporting Materials for Efficient Blue Thermally Activated Delayed Fluorescence Diodes through Compatibility Optimization. *Chem. Mater.* 27, 5131-5140 (2015).
38. Pommerehne, J. et al. Efficient two layer LEDs on a polymer blend basis. *Adv. Mater.* 7, 551-554 (1995).
39. Saeki, A., Seki, S., Takenobu, T., Iwasa, Y. & Tagawa, S. Mobility and dynamics of charge carriers in rubrene single crystals studied by flash-photolysis microwave conductivity and optical spectroscopy. *Adv. Mater.* 20, 920-923 (2008).
40. Namatame, M. et al. Direct observation of dramatically enhanced hole formation in a perovskite-solar-cell material spiro-OMeTAD by Li-TFSI doping. *Appl. Phys. Lett.* 110, 123904 (2017).
41. Abate, A. et al. Protic Ionic Liquids as p-Dopant for Organic Hole Transporting Materials and Their Application in High Efficiency Hybrid Solar Cells. *J. Am. Chem. Soc.* 135, 13538-13548 (2013).
42. Lee, H., Yang, N. & Cohen, A. E. Mapping Nanomagnetic Fields Using a Radical Pair Reaction. *Nano Lett.* 11, 5367-5372 (2011).

SUMMARY OF INVENTION

The present application includes the following inventions:
[1] A composition comprising an electron donor, an electron acceptor and a third component, wherein:
a combination of the electron donor and the electron acceptor is selected from combinations that exhibit long persistent luminescence upon an excitation, and
the third component is selected from materials with capabilities that receive an electron and then release an electron upon a photostimulation and materials with capabilities that receive a hole and then release a hole upon a photostimulation.

The combination of the electron donor and the electron acceptor that is used in the composition of the present invention is a long persistent luminescent emitter. Luminescence is observed at 10 K (preferably 300K also) after photo-irradiation of the long persistent luminescence emitter stops. The mechanism of the long persistent luminescence can be distinguished from those of phosphorescence and delayed-fluorescence.

The "electron donor" in the present invention means a molecule which releases an electron upon photo-irradiation of the composition of the present invention and is converted to an oxidized state such as a neutral radical state and a radical cation state (a neutral radical state is preferable in the present invention). The "electron acceptor" in the present invention means a molecule which receives the electron released from the electron donor and is converted to a reduced state such as a radical anion state and a neutral radical state. The presence of a radical can be confirmed by ESR (Electron Spin Resonance) measurement, absorption measurement or the like.

The luminescence from the combination of the electron donor and the electron acceptor that is used in the composition of the present invention is preferably exciplex luminescence or luminescence from a charge-transfer excited state. The "exciplex luminescence" or "luminescence from a charge-transfer excited state" in the present invention means luminescence from an excited state (exciplex) which is generated when an electron donor associates with an electron acceptor. The luminescence spectrum pattern of the exciplex luminescence is different from those of the luminescence observed from the electron donor alone and of the luminescence observed from the electron acceptor alone. The "exciplex luminescence" or "luminescence from a charge-transfer excited state" shows a luminescence spectrum pattern different from those of the luminescence observed from the electron donor alone and of the luminescence observed from the electron acceptor alone upon photo-irradiation. Here, the luminescence spectrum pattern of the long persistent luminescence emitter of the present invention has a different luminescence spectrum shape from those of the luminescence spectrum observed from the electron donors alone and of the luminescence spectrum observed from the electron acceptors alone. This means: the wavelength of the maximum luminescence may be different; the half width or the rising slope of a luminescence peak may be different; or the number of luminescence peaks may be different.

The oxidized state of the electron donors and the reduced state of the electron acceptors are stable. It is presumed that, due to these features, electron donors in the oxidized state and electron acceptors in the reduced state accumulate in the long persistent luminescence emitter during photo-irradiation and that the luminescence continues by the recombination of the molecules even after the photo-irradiation stops. Accordingly, the long persistent luminescence emitter can continue to exhibit luminescence for a long time.

The long persistent luminescence emitter means a long persistent luminescence emitter having persistent luminescence duration time of 0.1 seconds or longer. The persistent luminescence duration time of the long persistent luminescence emitter of the present invention is preferably 1 second or longer, more preferably 5 seconds or longer, further preferably 5 minutes or longer, still further preferably 20 minutes or longer. The long persistent luminescence emitter of the present invention preferably achieves not only such long persistent luminescence duration time at 10 K but also such long persistent luminescence duration time at 20° C.

The emission intensity can be measured using, for example, a spectrometer. The emission intensity of luminescence of less than 0.01 cd/m$^2$ can be considered as undetectable. In the working examples shown below, the detection limit is $\frac{1}{1000}$ of the initial emission intensity.

The long persistent luminescence can be confirmed when a log-log graph showing the change in the emission intensity with time after applying light to the long persistent luminescence emitter, for example, for three minutes and stopping the photo-irradiation (the emission intensity on a logarithmic scale of the y-axis and the time on a logarithmic scale of the x-axis) is non-exponential. It has been confirmed that, in the case of general phosphorescence due to photoluminescence of an organic compound, the emission intensity decays exponentially. A semi-log graph of the emission intensity on a logarithmic scale of the y-axis and the time of the x-axis (time on a linear scale, but not on a logarithmic scale) shows exponential decay (first-order decay). On the other hand, the semi-log graph of the luminescence from the long persistent luminescence emitter of the present invention shows non-exponential decay, and the luminescence mechanism is clearly different from that of general phosphorescence.

In some embodiments of the present invention, the long persistent luminescence emitter (i.e. the combination of an electron donor and an electron acceptor) contains at least 70 mol % of an electron donor and less than 30 mol % of an electron acceptor, preferably at least 90 mol % of an electron donor and less than 10 mol % of an electron acceptor, for example at least 95 mol % of an electron donor and less than 5 mol % of an electron acceptor, at least 99 mol % of an electron donor and less than 1 mol % of an electron acceptor, based on the total amount by mole of the electron donor and the electron acceptor. The proportion of the electron donors is higher than the proportion of the electron acceptors. Due to this, holes move easily from HOMO to HOMO of the electron donors, and the recombination of holes and electrons can be caused with a high probability.

In some embodiments of the present invention, the long persistent luminescence emitter contains at least 70 mol % of an electron acceptor and less than 30 mol % of an electron donor, preferably at least 90 mol % of an electron acceptor and less than 10 mol % of an electron donor, for example at least 95 mol % of an electron acceptor and less than 5 mol % of an electron donor, at least 99 mol % of an electron acceptor and less than 1 mol % of an electron donor, based on the total amount by mole of the electron donor and the electron acceptor. The proportion of the electron acceptors is higher than the proportion of the electron donors. Due to this, electrons move easily from LUMO to LUMO of the electron acceptors, and the recombination of holes and electrons can be caused with a high probability.

The combinations of an electron donor and an electron acceptor disclosed in Non-patent Documents No. 10 to 15 above, WO2018/105633 (US2018-0346807A1), WO2019/031524 (US2020-0165516A) and WO2019/189045 can be used in the present application. These six non-patent documents and five patent documents are hereby expressly incorporated by reference, in their entirety, into the present application.

The third component (trap/emitter) may be an organic semiconductor, a cationic material, an anionic material or a metallic material. The third component (trap/emitter) is preferably an organic material. In a preferred embodiment, when the third component (trap/emitter) is in a radical anion state and subjected to a photostimulation, the third component releases an unpaired electron.

In one embodiment of the present invention, the electron acceptor and the third component satisfy one of the following expression:

$$\text{LUMO (Acpt)} > \text{LUMO (Trap/Em)} + 0.4 \text{ eV}$$

$$\text{LUMO (Acpt)} > \text{LUMO (Trap/Em)} + 0.5 \text{ eV}$$

$$\text{LUMO (Acpt)} \geq \text{LUMO (Trap/Em)} + 0.6 \text{ eV}$$

wherein LUMO (Acpt) represents a lowest excited singlet energy level of the electron acceptor, and LUMO (Trap/Em) represents a lowest excited singlet energy level of the third component.

The electron donor, the electron acceptor and the third component may consist of three or more atoms selected from the group consisting of C, H, N, O, S, P, B and halogen atoms. In some embodiments of the invention, the electron donor, the electron acceptor and the third component consist of three or more atoms selected from the group consisting of C, H, N, O, S and P. In some embodiments of the invention, the electron donor, the electron acceptor and the third component consist of three or more atoms selected from the group consisting of C, H, N, O, B and F.

[2] The composition according to [1], wherein the photostimulation is near infrared light irradiation.

The composition of the present invention may be in the form of film (layer), coating, plate, particles, dispersion, solution and others.

[3] The composition according to [1] or [2], exhibiting luminescence mainly from the third component upon the excitation.

[4] The composition according to [1] or [2], exhibiting luminescence mainly from an exciplex formed by the electron donor and the electron acceptor upon the excitation.

[5] An organic photostimulated luminescent device comprising the composition according to any one of [1] to [4].

The term "photostimulated luminescent device" is a device that releases stored energy by producing a luminescent signal in response to a photostimulation. In a preferred embodiment of the present invention, the photostimulated luminescent device emits visible light in response to a photostimulation. The photostimulation includes photoirradiation such as infrared light irradiation including near infrared irradiation (780 nm to 2500 nm), and visible light irradiation including red light irradiation (640 nm to 770 nm), orange light irradiation (590 nm to 640 nm), yellow light irradiation (550 nm to 590 nm), green light irradiation (490 nm to 550 nm), blue light irradiation (380 to 490 nm). In a preferred embodiment of the present invention, the photostimulation is near infrared light irradiation.

The energy for the photostimulated luminance has been stored before the photostimulation. The energy for the photostimulated luminance may be stored by photoirradiation such as ultraviolet light irradiation (100 nm to 400 nm; typically UV-A irradiation (315 nm to 400 nm)), blue light irradiation (380 to 490 nm) and green light irradiation (490 nm to 550 nm). The photoirradiation for energy storage generally has a shorter wavelength than the photoirradiation for photostimulation. The energy for the photostimulated luminance may be stored by current injection.

The term "organic photostimulated luminescent device" is a photostimulated luminescent device in which all of the electron donor, the electron acceptor and the third component are organic materials free from rare metal elements, preferably organic materials free from metal elements. In a preferred embodiment of the present invention, the organic materials consist of C and at least one element selected from H, B, N, O, F, Si, P, S, Cl, Se, Br and I. In more preferred embodiment of the present invention, the organic materials consist of C and at least one element selected from H, B, N, O, Si, P and S.

In a preferred embodiment of the present invention, the organic photostimulated luminescent device has a layer containing the composition. If the energy for photostimulated luminance is stored by current injection, the device generally has a pair of electrodes sandwiching the layer containing the composition.

According to the present invention, a flexible organic photostimulated luminescent device can be provided.

In a preferred embodiment of the present invention, the third component (trap/emitter) emits a visible light. In one embodiment, the exciplex of the electron donor and the electron acceptor also emits light. In another embodiment, the exciplex of the electron donor and the electron acceptor emits light but the third component does not emit light.

[6] A luminescent method by photostimulation, comprising:
exciting the composition according to any one of [1] to [4], and
photostimulating the composition to exhibit luminescence.

[7] The luminescent method by photostimulation according to [6], satisfying the following (1) or (2):
(1)
an electron is transferred from the electron donor to the electron acceptor by the excitation to generate an electron donor in a radical cation state and an electron acceptor in a radical anion state,
an electron of the electron acceptor in a radical anion state is trapped by the third component,
the trapped electron on the third component is detrapped and transferred to an electron acceptor by a photostimulation to generate an electron acceptor in a radical anion state, and
the detrapped electron of the electron acceptor in a radical anion state is recombined with a hole of the electron donor in a radical cation state whereby an exciplex of the electron donor and the electron acceptor is generated to cause luminescence, or (2)
an electron is transferred from the electron donor to the electron acceptor by the excitation to generate an electron donor in a radical cation state and an electron acceptor in a radical anion state,
a hole of the electron donor in a radical cation state is trapped by the third component,
the trapped hole on the third component is detrapped and transferred to an electron donor by a photostimulation to generate an electron donor in a radical cation state, and
the detrapped hole of the electron donor in a radical cation state is recombined with an electron of the electron acceptor in a radical anion state whereby an exciplex of the electron donor and the electron acceptor is generated to cause luminescence.

In a preferred embodiment of the present invention, the third component receiving the energy from the exciplex emits light. In some embodiment of the present invention, the energy is further transferred from the third component to a light-emitting material and the light-emitting material emits light.

In a preferred embodiment of the present invention, when a photostimulation is applied to a device in which no luminescence is observed, photostimulated luminescence is emitted from the device.

[8] The luminescent method by photostimulation according to [6] or [7], further comprising applying a magnetic field to the composition to control intensity of the luminescence upon the photostimulation.

[9] Use of the composition according to [6] or [7] in imaging, marking, optical data storage, optical sensing, optical energy conversion and security seals.

More specifically, the composition may be used in solar cells, photocatalysts, bioimaging, biomarkers, medical imaging plates (X-ray imaging plate), optical sensors, bioimaging probes, optical energy sensors, security stickers, security labels, security tapes and others. If a security label of the invention was affixed to the inside of a safe or a confidential document that are set to be exposed to excitation light when opened, you can check if they have been opened by irradiating the seal with NIR light.

[10] A method for designing a composition for photostimulated luminescence comprising:
1) evaluating photostimulated luminescence of the composition according to any one of [1] to [4],
2) modifying at least one of the electron donor, the electron acceptor and the third component to so design a new composition as to improve photostimulated luminescence, and
3) optionally repeating 2) at least once.

Biocompatible compositions can be designed by selecting the three components from biocompatible materials. Soluble compositions can be designed by selecting the three components from the materials soluble to the solvent to be used. The excitation wavelength can be tuned by selecting an electron donor from the materials that are excited by a desired wavelength. The stimulation wavelength can be tuned by selecting a donor from the materials in which unpaired electron in the radical anion state is excited by a desired wavelength. The wavelength of the photostimulated luminescence can be tuned by selecting a donor from the light emitting materials having a desired emission wavelength.

BRIEF DESCRIPTION OF THE DRAWINGS

FIG. 10. ESR measurements. a, ESR spectra of the m-MTDATA/PPT/Rb film under dark condition (black line), UV irradiation (red line), and UV and NIR irradiation (blue line). The wavelengths of UV and NIR light were 365 nm and 810 nm, respectively. b, Differential ESR spectrum obtained by subtracting the blue line from the red line in panel a.

DETAILED DESCRIPTION OF INVENTION

Figure 1:
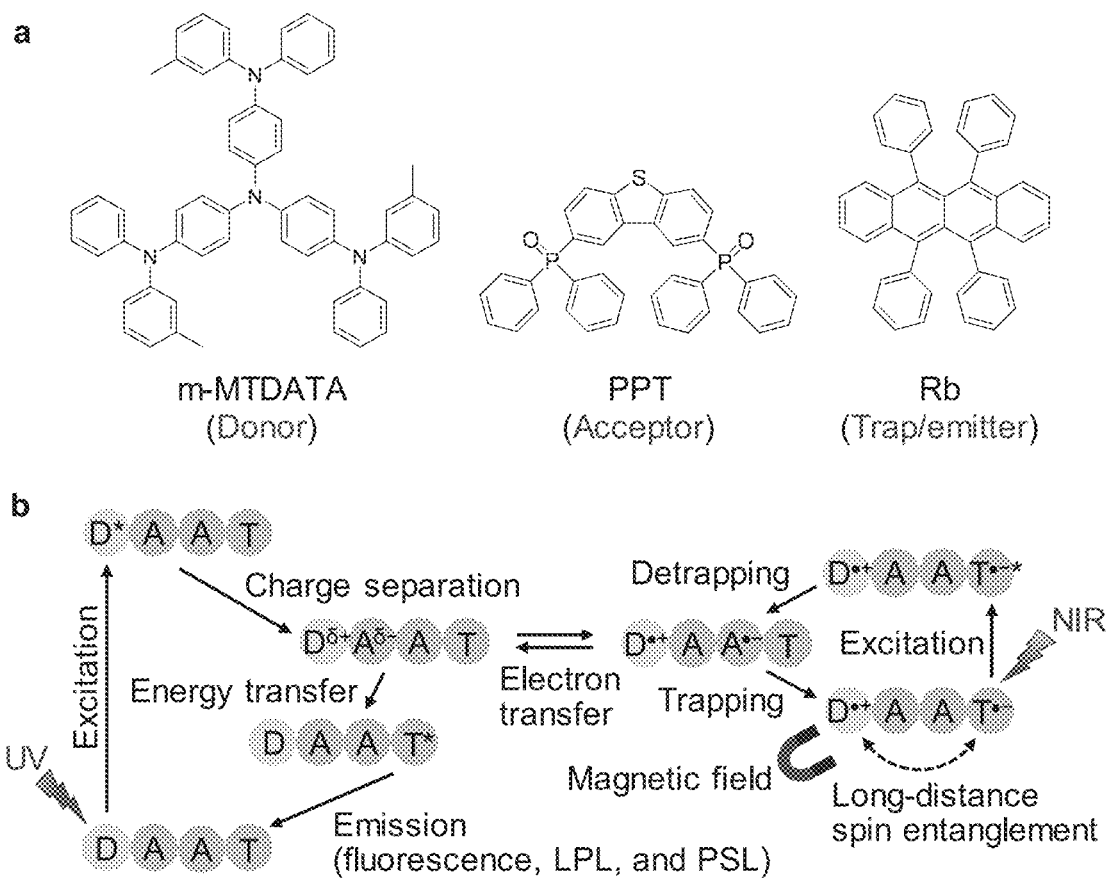
FIG. 1. Schematic Illustration of organic PSL systems. a, Molecular structures of m-MTDATA, PPT, and Rb used as electron donor, acceptor, and trap/emitter molecules, respectively. b, Energy diagram of organic PSL system. During UV excitation, an electron is transferred from the excited state of donor (D) to acceptor (A) to form the CT excited state or exciplex ($D^{\delta+}A^{\delta-}$). The electrons in the film diffuse between A molecules and are partly captured by trap/emitter (T) molecules, forming their radical anions ($T^{\bullet-}$). The excited state of $T^{\bullet-}$ ($T^{\bullet-*}$) formed by NIR stimulation causes electron transfer to A, followed by reencountering of $A^{\bullet-}$ with $D^{\bullet+}$. The excited state of T ($T^*$) is then formed via FRET from the regenerated CT state, resulting in visible PSL in addition to LPL. The luminescence from $T^*$ is also modulated by external magnetic fields through long-distance spin entanglement between singlet and triplet states of the $D^{\bullet+} \ldots T^{\bullet-}$ pair.

In this paper, we demonstrate purely organic photostimulated luminescence (PSL) over a wide range of colors utilizing ultraviolet (UV) and near-infrared (NIR) light for multiple write-in and read-out cycles, respectively, by adding a molecule with dual roles as an electron trap and light emitter to an organic LPL system. As a model system, we first explore a ternary blend film of electron donor (4,4',4"-tris[(3-methylphenyl)phenylamino]triphenylamine; m-MTDATA) (1 mol %), electron acceptor (2,8-bis(diphenylphosphoryl)dibenzo[b,d]thiophene; PPT), and electron trap/emitter (5,6,11,12-tetraphenyltetracene; Rb) (1 mol %, unless otherwise noted) (FIG. 1a). Excitation of the film with UV light induces formation of charge-separated states between m-MTDATA and PPT, resulting in a green-emitting charge transfer (CT) excited state or exciplex (FIG. 1b).[20] The excitation energy of the CT excited state is transferred to Rb via Förster resonance energy transfer (FRET), resulting in persistent orange emission. These processes are analogous to the organic LPL phenomena reported previously.[15]

At the same time, a portion of the electrons are captured by neutral Rb molecules, which have lowest unoccupied molecular orbitals (LUMOs) that are approximately 0.8 eV lower than that of PPT, to form the long-lived radical anions of Rb (Rb$^{\bullet-}$). Since Rb$^{\bullet-}$ possesses strong absorption bands in the NIR region, NIR excitation can induce electron transfer from doublet excited Rb$^{\bullet-}$ to neighboring PPT molecules, thereby producing mobile electrons in the PPT film for formation of CT states and subsequent FRET to Rb. In this way, the trap/emitter can enable PSL and the optical writing and reading of data in organic films.

Organic PSL Characteristics

Figure 2:
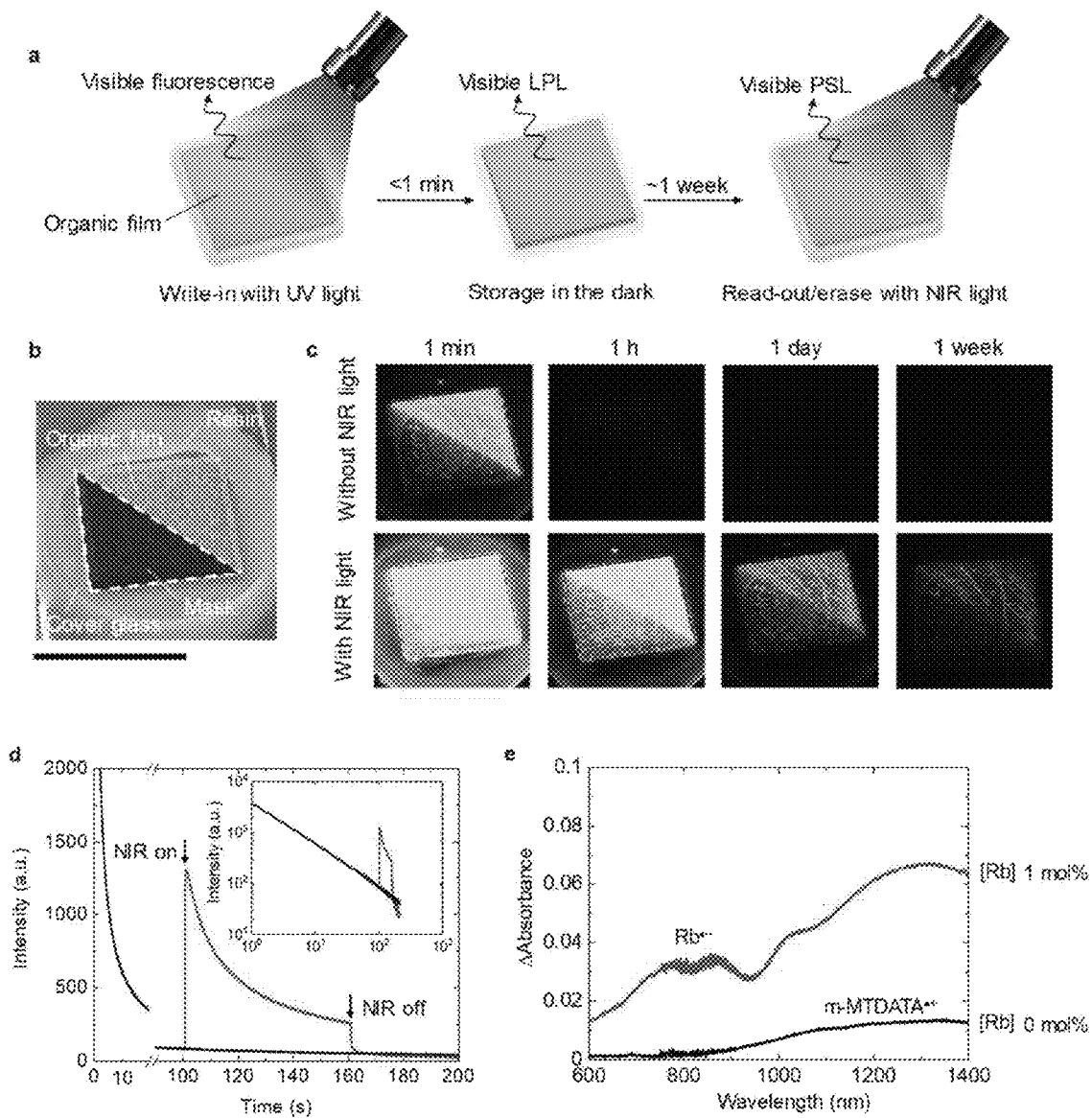
FIG. 2. Organic PSL from the m-MTDATA/PPT/Rb blend films. a, Write-in and read-out processes. b, Photograph of the m-MTDATA/PPT/Rb film. A part of the sample was masked during UV light irradiation. The scale bar is 10 mm. c, Photographs of the samples without and with NIR light irradiation after stopping UV light irradiation. d, Emission decay profiles obtained for the m-MTDATA/PPT/Rb film with and without NIR irradiation (red and black lines, respectively). The inset shows the logarithmic plots of the decay profiles. The wavelengths of UV and NIR light were 365 nm and 800 nm, respectively. e, Differential absorption spectra obtained for the m-MTDATA/PPT/Rb (0.1 mol %) films before and after 365-nm light irradiation.

Optical write-in and read-out processes based on organic PSL are schematically illustrated in FIG. 2a. First, an organic film is exposed to UV light for approximately one minute to write in information. The irradiated film is kept in the dark for a defined time and then exposed to NIR light for reading out the stored information as visible PSL. FIG. 2b displays a photograph of the m-MTDATA/PPT/Rb film prepared by reported procedures in an argon-filled glove box.[15] After stopping UV irradiation for one minute, orange LPL was clearly seen from the film, except for from the masked region, and gradually weakened over time. Surprisingly, NIR light irradiation of the film dramatically enhanced this orange emission to the point of being visible to the naked eye after keeping the film in the dark at room temperature for one day after stopping UV irradiation and with a commercial digital camera one week after UV irradiation (FIG. 2c). The irradiated triangular area seemed to have been retained to ensure long-term storage ability, although emission was seen in cracks within the masked region probably due to light scattering or waveguiding inside the film. In the absence of Rb, such a significant enhancement was not observed.

Luminescence properties of the films were examined by using an inverted fluorescence microscope (FIG. 6a). To avoid the effects of structural heterogeneities such as cracks, uniform regions were carefully selected and measured (Extended Data FIGS. 2b and c). Typical time profiles of LPL after stopping UV irradiation are shown in FIG. 2d. The LPL intensity suddenly increased more than 15 times upon NIR irradiation (see the arrow) without apparent changes in the spectral shape (FIG. 7a). This observation is indicative of PSL, which could be repeated for 10 write-in/read-out cycles for the same sample with an ~10% loss in initial intensity (FIG. 7b).

Figure 8:
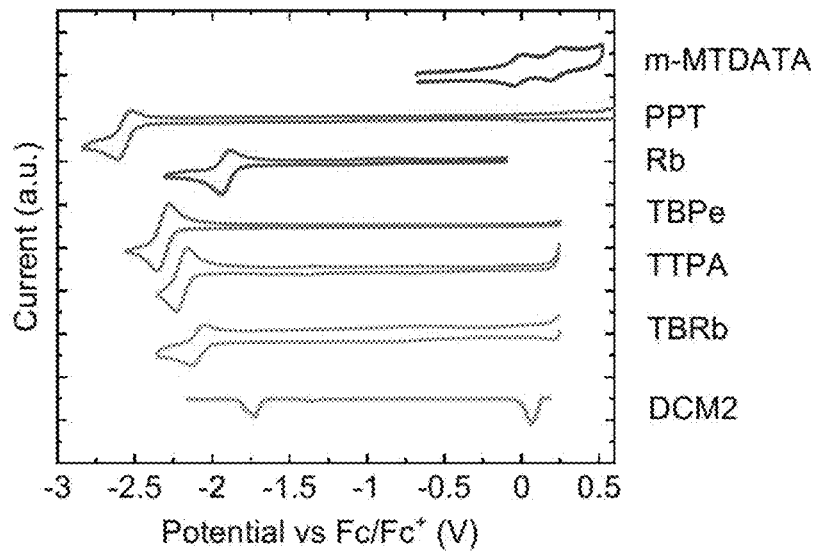
FIG. 8. Electrochemical measurements. a, Cyclic voltammograms of organic compounds used in this study. b, Absorption spectra of m-MTDATA radical cation, PPT radical anion, Rb radical anion, and TBPe radical anion obtained by difference absorption spectra of electrical oxidation or reduction.
Figure 8:
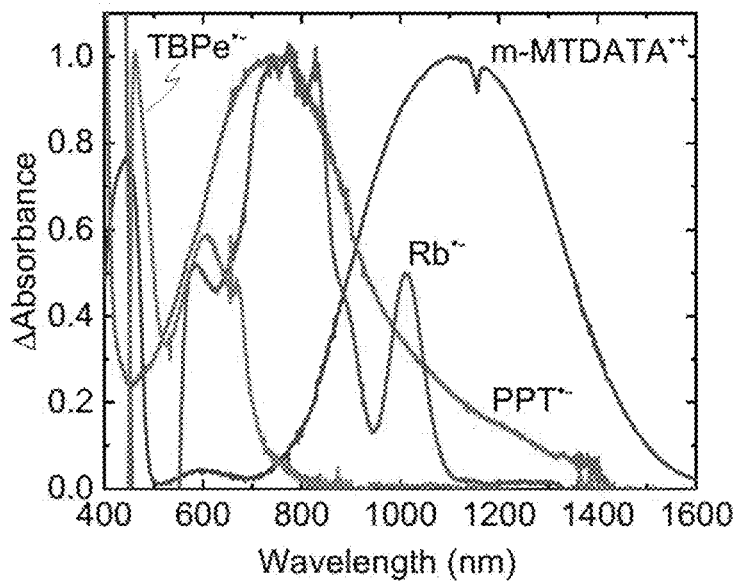
Figure 10:
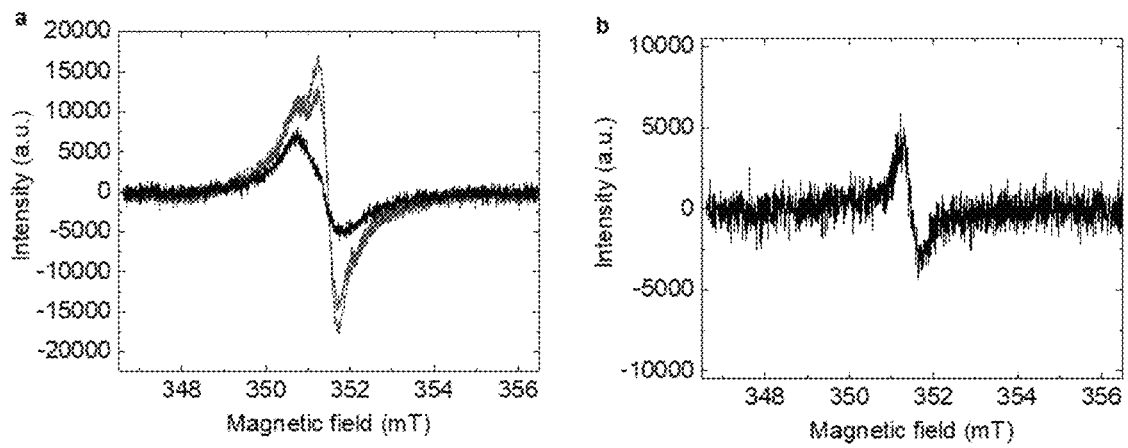

To confirm the existence of Rb$^{\bullet-}$, we measured optical absorption spectra for the m-MTDATA/PPT/Rb (Rb concentration of 0 or 1 mol %) films before and after UV irradiation, and then derived differential spectra. As shown in FIG. 2e and FIG. 8, characteristic absorption bands of Rb$^{\bullet-}$ were observed at approximately 800 and 1,000 nm[21] only for the film containing Rb, while both films exhibited a broad band from 900 to 1,400 nm, which is analogous to the absorption spectrum of m-MTDATA radical cations (m-MTDATA$^{\bullet+}$).[22] The absorption decayed slowly over time after stopping UV irradiation (Extended Data FIGS. 5a-c), indicating a gradual depletion of radical species accumulated in the film. The existence of Rb$^{\bullet-}$ was further supported by electron spin resonance (ESR) spectral measurements (FIG. 10).

Figure 5:
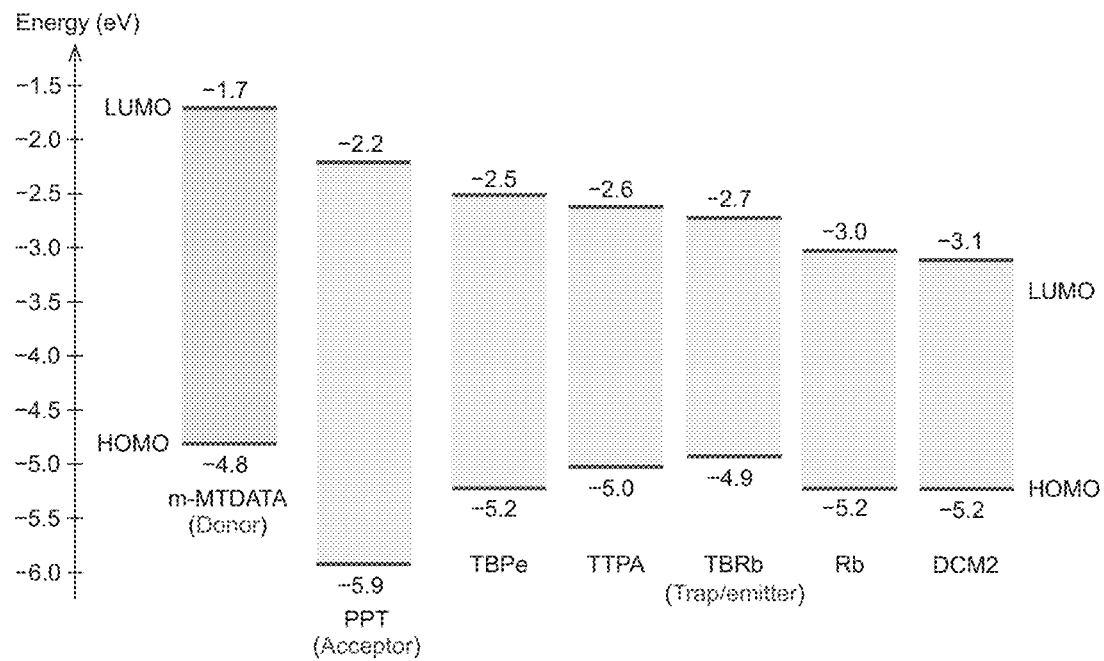
FIG. 5. HOMO and LUMO energy levels. The HOMO level of m-MTDATA and LUMO levels of PPT and trap/emitter molecules were calculated from redox peaks of cyclic voltammograms. The energy gaps between HOMO and LUMO levels were calculated from the onsets of the absorption spectra observed for solution samples.
Figure 9:
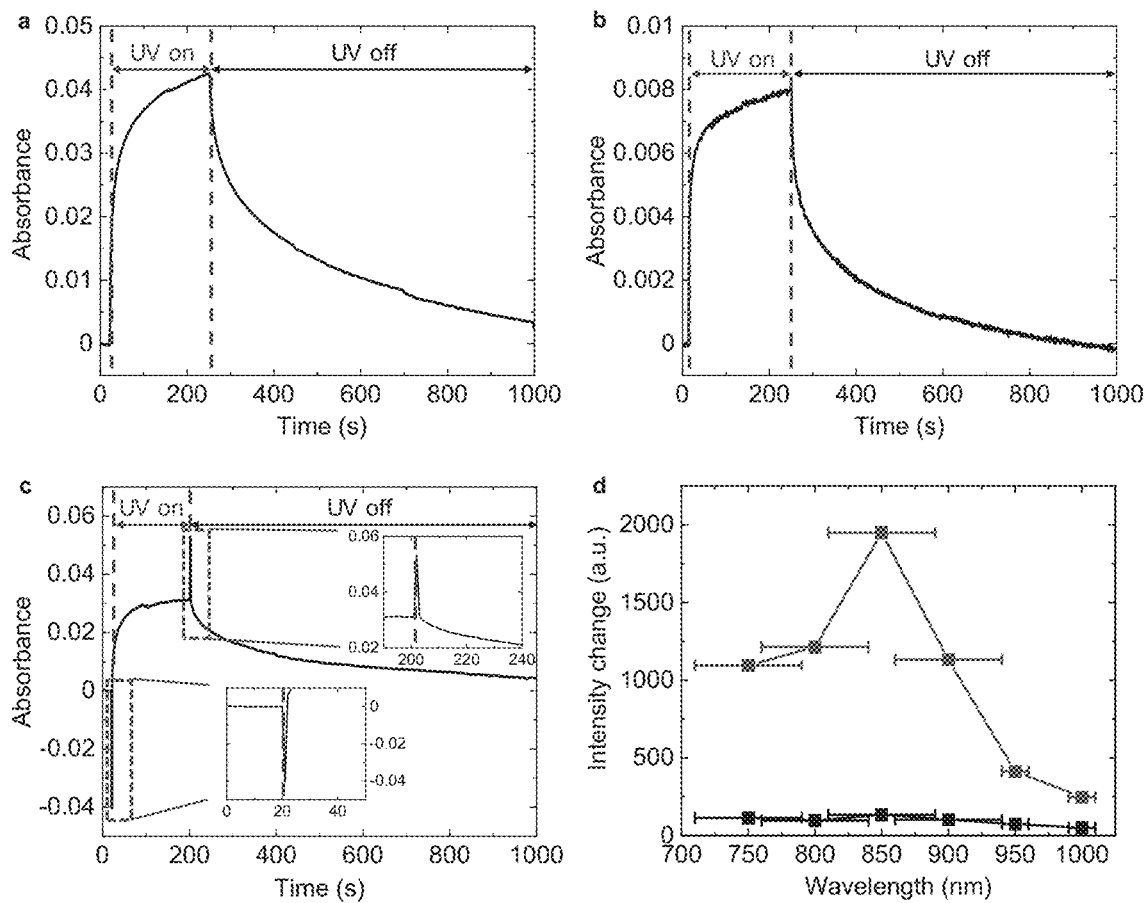
FIG. 9. Observation of long-lived radicals. a, Time profile of differential absorbance observed at 1100 nm for the m-MTDATA/PPT/Rb film. b, Time profile of differential absorbance observed at 1100 nm for the m-MTDATA/PPT film. c, Time profile of differential absorbance observed at 740 nm for the m-MTDATA/PPT/Rb film. The excitation wavelength was 365 nm. d, Emission intensity changes at each excitation wavelength observed for the m-MTDATA/PPT (black) and m-MTDATA/PPT/Rb (red) films at 100 s after stopping 365-nm light irradiation. The error bars indicate the bandwidth (FWHM) of the bandpass filters (Thordabs) used for monochromatic excitation with the same number of emitted photons.

To verify the origin of PSL, an action spectrum, where intensity changes upon NIR stimulation are plotted as a function of excitation wavelength, was measured. As shown in FIG. 9d, the intensity change strongly depends on the excitation wavelength. For example, the intensity change at 850 nm is almost seven-fold greater than that at 1,000 nm, which corresponds to a photon energy (~1.24 eV) greater than the energy difference (~0.8 eV) between the LUMO levels of PPT and Rb (FIG. 5). The obtained spectral shape roughly matches the absorption spectrum of Rb$^{\bullet-}$, thus suggesting the importance of spectral matching between stimulation light and electronic absorption of radical anions of trap/emitter molecules. The electron transfer from the excited radical anions (e.g., perylene diimide radical anion) has been characterized by time-resolved spectroscopies and utilized for photoredox reactions such as reductive dehalogenation of aryl halides in spite of their short lifetimes on the pico- to nanosecond time scale.[23-26] The high extinction coefficient of Rb$^{\bullet-}$ ($\varepsilon \approx 2 \times 10^4$ M$^{-1}$ cm$^{-1}$ at ~800 nm)[21] is thus preferable for NIR stimulation. The intensity enhancement of the film without trap/emitter molecules was very low, which is consistent with the fact that negligible absorption was observed in FIG. 2e, possibly due to a small ε of PPT·−. It can be concluded that the trap/emitter molecules in the film capture some of the electrons and release them as visible PSL by NIR excitation of their radical anion state (FIG. 1b).

Multicolor Organic PSL

Figure 3:
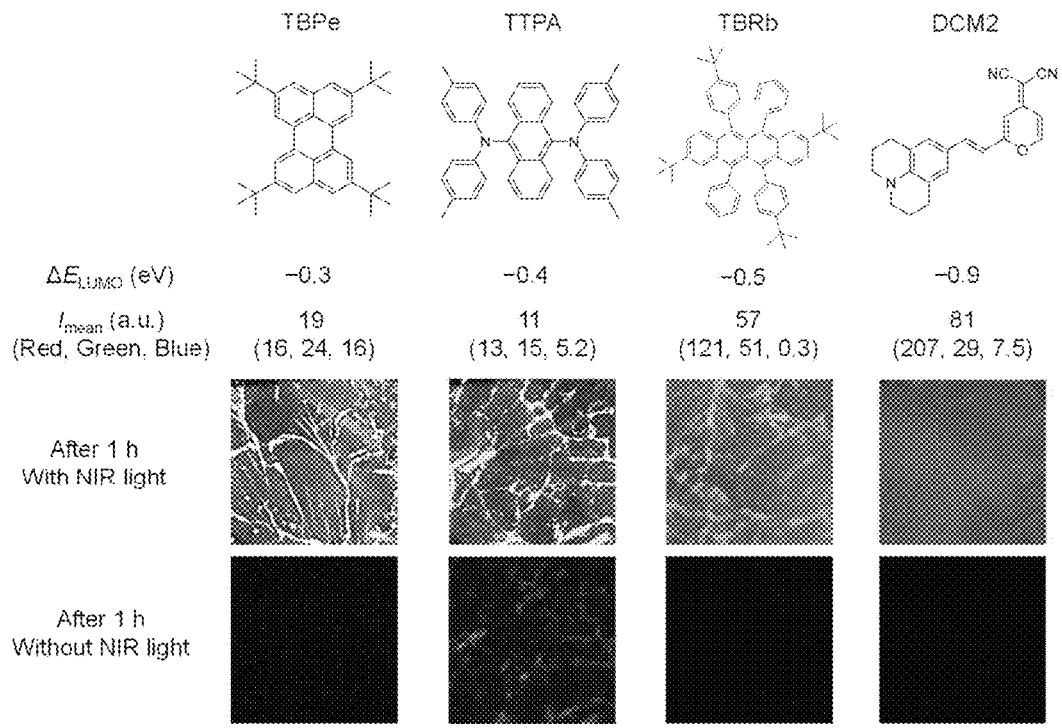
FIG. 3. Color tuning of PSL with different trap/emitter molecules. Molecular structures of trap/emitter molecules and corresponding photographs of the blend films containing different trap/emitter molecules (1 mol %) with and without NIR irradiation. The wavelengths of UV and NIR light were 365 nm and 800 nm, respectively. The actual size of the films in the images is 5 mm×5 mm. The difference of LUMO energy ($\Delta E_{LUMO}$) was calculated from $E_{LUMO}$ (trap/emitter)–$E_{LUMO}$ (PPT) based on the reduction potentials of the materials (FIG. 5). The mean intensity ($I_{mean}$) of PSL was calculated from the red, green, and blue components of the color image taken by a digital camera. The exposure time was 10 s. The brightness and contrast of images are different for each sample.

The proposed scheme is applicable for color tuning with different trap/emitter molecules (2,5,8,11-tetra-tert-butylperylene (TBPe), 9,10-bis[N,N-di-(p-tolyl)-amino]anthracene (TTPA), 2,8-di-tert-butyl-5,11-bis(4-tert-butylphenyl)-6,12-diphenyltetracene (TBRb), and 4-(dicyanomethylene)-2-methyl-6-julolidyl-9-enyl-4H-pyran (DCM2)) whose LUMO levels are lower than that of PPT (−2.2 eV). As demonstrated in FIG. 3 and FIG. 7a, all the samples exhibited detectable PSL with different colors and spectra similar to their LPL without NIR irradiation. The m-MTDATA/PPT/TBRb film exhibited characteristics similar to the Rb sample because of the analogous structures of the trap/emitter molecules. DCM2 also showed a strong red PSL.

Figure 11:
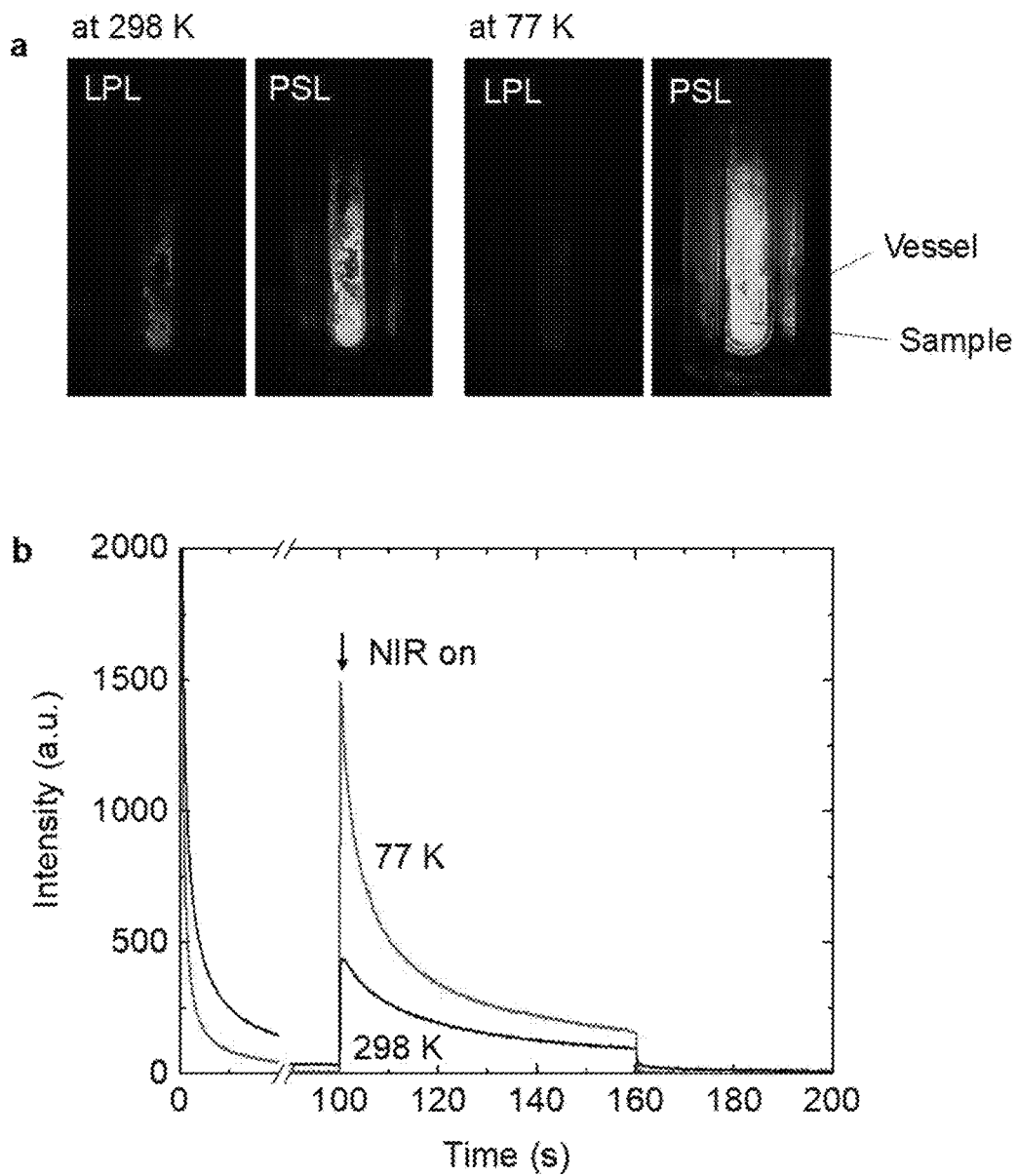
FIG. 11. PSL at 77 K. a, Photographs showing LPL and PSL captured for the m-MTDATA/PPT/Rb amorphous solid at 298 K (left) and 77 K (right). The photographs of LPL were obtained after stopping UV light irradiation for 60 s. The photographs of PSL were obtained under NIR light irradiation at 100 s after stopping UV light irradiation for 60 s. The acquisition times were 10 s. b, Emission decay profiles obtained for the m-MTDATA/PPT/Rb amorphous solid at 298 K (black) and 77 K (red) with and without NIR irradiation (see the arrow). The wavelengths of UV and NIR light were 365 nm and 850 nm, respectively. The sample was placed just above the objective lens (FIG. 6a) and exposed to UV or NIR light. The wavelengths of UV and NIR light were 365 nm and 850 nm, respectively.

On the other hand, relatively weak NIR responses were observed for TBPe and TTPA. Since these molecules have LUMO energies lower than the others, we can exclude the possibility that the PSL simply originates from the thermal release of electrons from trap sites by NIR irradiation. In fact, significant PSL was observed for the m-MTDATA/PPT/Rb film even at 77 K (FIG. 11). In the case of TBPe, the weak PSL may be due to inefficient excitation of radical anions since TBPe·− has very weak absorption bands in the NIR region.[27] These results may also suggest that trapping of electrons at depths deeper than 0.5 eV from the LUMO level of PPT could be necessary for intense PSL. Unfortunately, absorption spectra of radical anions of TTPA and DCM2 could not be obtained by spectroelectrochemistry due to simultaneous oxidation on a counter electrode and irreversibility in solution, respectively (FIG. 8a). Further studies are thus required to establish the design principle of organic PSL systems.

Magnetic Field Effects

Figure 12:
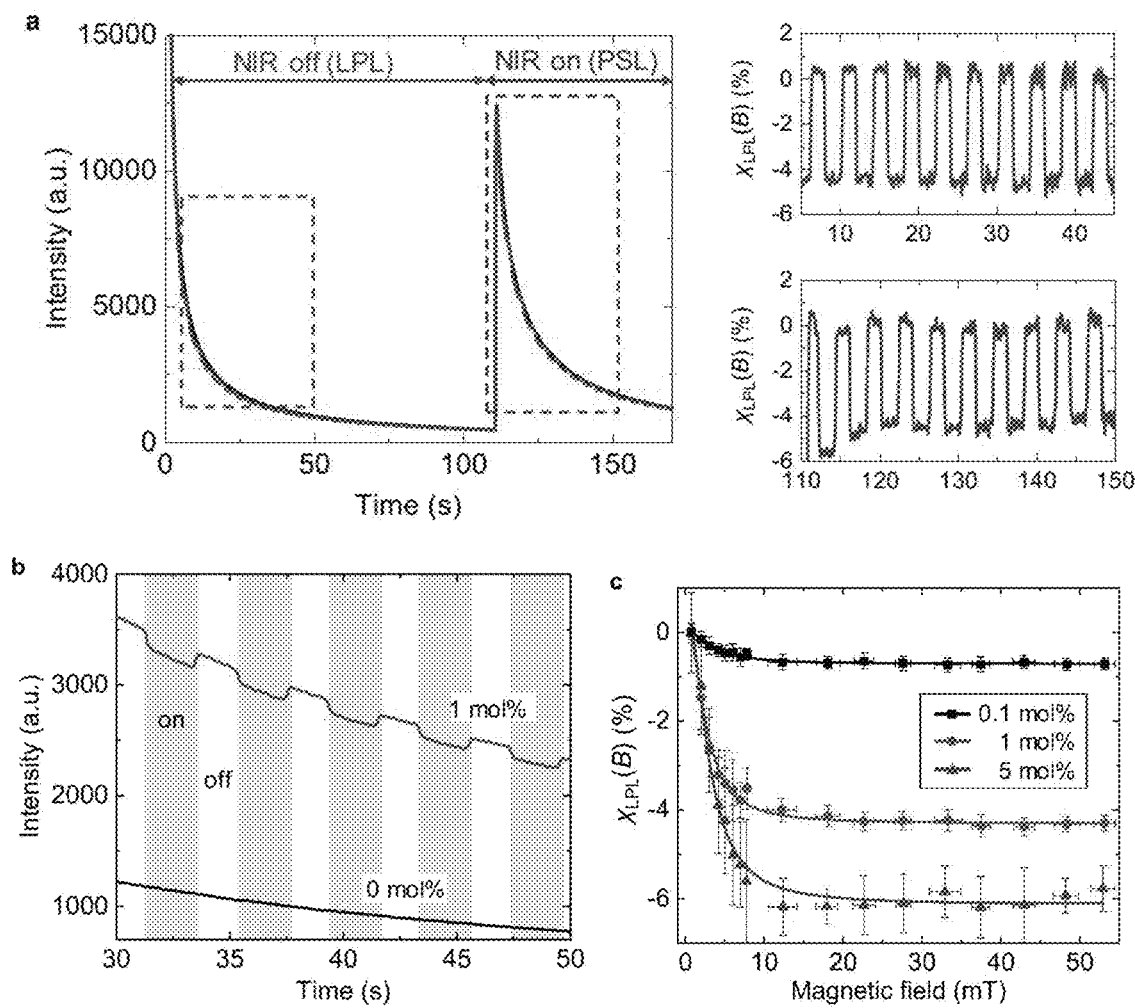
FIG. 12. MFEs on LPL. a, MFEs on the LPL decay profiles of the m-MTDATA/PPT/Rb (1 mol %) film with and without NIR irradiation. The magnetic fields were modulated between 0.6 and 30 mT. The wavelengths of UV and NIR light was 365 nm and 800 nm, respectively. $\chi_{LPL}(B)$ values obtained without (upper right) and with (lower right) NIR irradiation. b, Responses of LPL intensity obtained for the films with (red line) and without (black line) Rb (1 mol %) to the external magnetic field after stopping UV irradiation. The gray color indicates the application of a magnetic field. c, Plots of $\chi_{LPL}(B)$ as a function of magnetic field obtained for the m-MTDATA (1 mol %)/PPT/Rb (0.1, 1, and 5 mol %) films. The solid lines indicate the fitted data by the Lorentzian function.

To investigate the dynamics of the long-lived radical species in the blend films, magnetic field effects (MFEs) on LPL and PSL were examined by applying external magnetic fields (B) with an electromagnet to the sample under the inverted fluorescence microscope.[28] As demonstrated by previous studies,[29-31] MFEs in organic light-emitting diodes (OLEDs) provide an underlying model for interconversion between singlet and triplet states that is highly related to device performance. Interestingly, as demonstrated in FIG. 4a and FIG. 12, significant negative MFEs were observed for LPL and PSL, while no MFE was seen for the film without Rb, implying that trap/emitter molecules play a crucial role.

Figure 4:
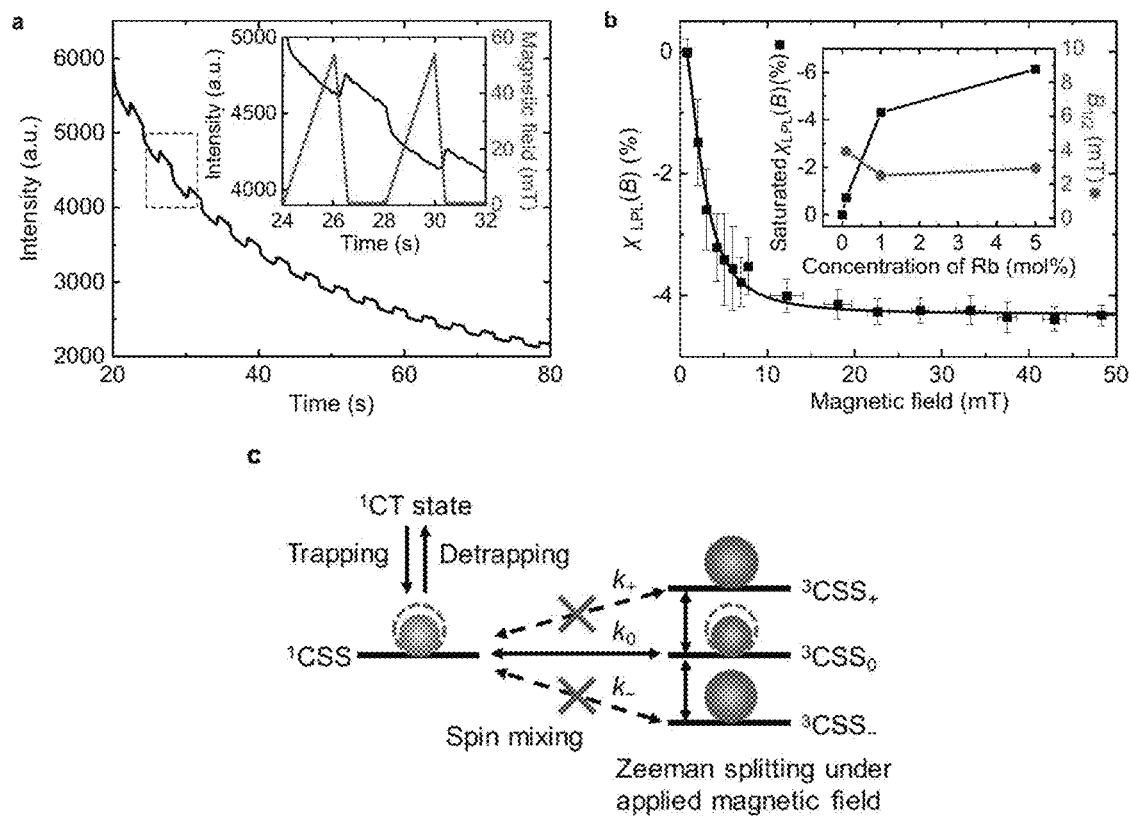
FIG. 4. Magnetic field effects. a, The response of LPL intensity to the external magnetic fields observed for the m-MTDATA/PPT/Rb film. The inset shows an enlarged view of the region contained within the dotted line and applied magnetic fields. b, Plots of $\chi_{LPL}(B)$ as a function of the external magnetic field (B). The solid line shows the least-squares fit of data to the Lorentzian function. The inset indicates the dependence of the saturated $\chi_{LPL}(B)$ and $B_{1/2}$ values on the Rb concentration. c, A simplified model for magnetic field-induced population changes (circles in dotted lines) of singlet (green) and triplet (blue) charge-separated states (CSSs).
Figure 13:
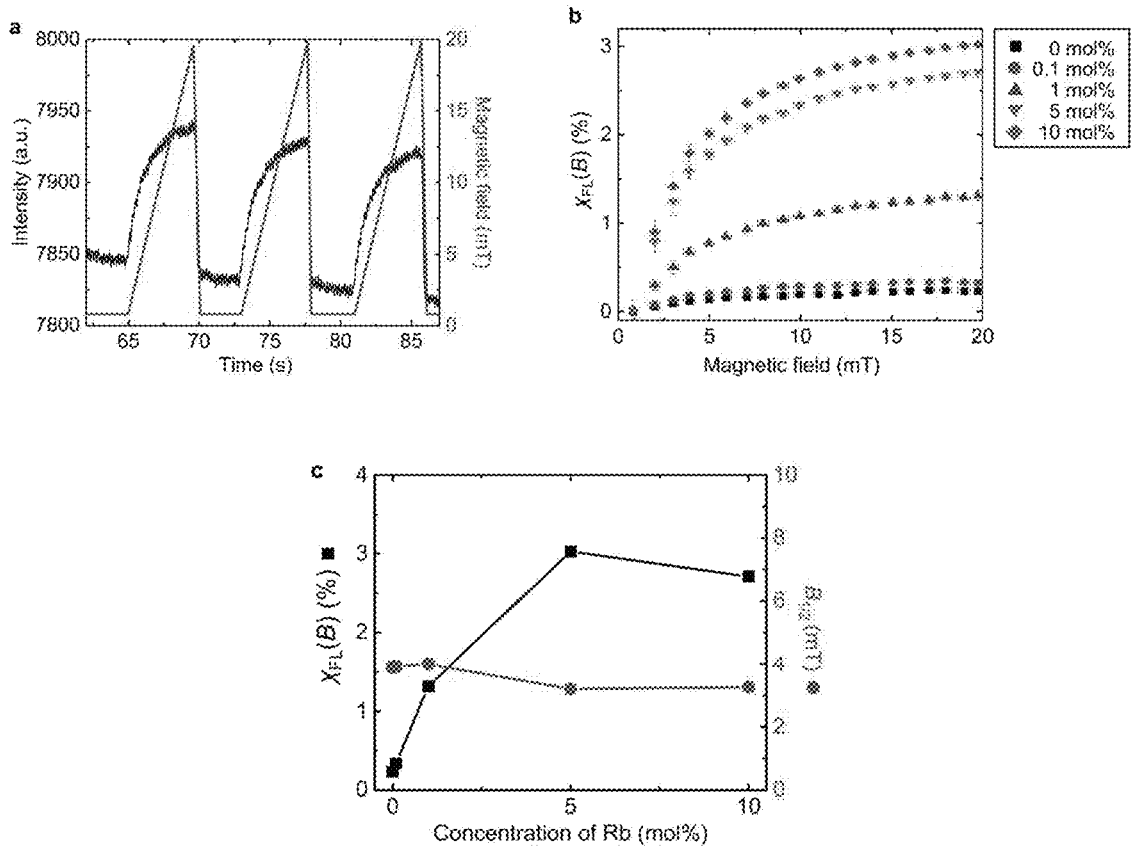
FIG. 13. MFEs on fluorescence. a, Fluorescence intensity response of the m-MTDATA/PPT/Rb film to the external magnetic fields under UV irradiation. The excitation wavelength was 365 nm. b, Plots of $\chi_{FL}(B)$ values as a function of magnetic field observed for the m-MTDATA/PPT/Rb (0, 0.1, 1, 5, and 10 mol %) films. c, Dependences of the $\chi_{FL}$ and $B_{1/2}$ values on the Rb concentration.

The MFEs in the LPL process can be expressed as $$\chi_{LPL}(B) = \frac{LPL(B, t) - LPL(0, t)}{LPL(0, t)} \quad (1)$$

where LPL(B,t) and LPL(0,t) represent the LPL intensity at time t in the presence and absence of external magnetic field (B), respectively. The $\chi_{LPL}(B)$ values were plotted as a function of magnetic fields and were then fitted by the Lorentzian function (FIG. 4b). As summarized in the inset, the absolute values of saturated $\chi_{LPL}(B)$ increased with increasing Rb concentration (FIG. 12c), while the $B_{1/2}$ values (defined as the magnetic field at which the change in emission intensity reaches half of its saturation value) remained constant. A large deviation from the linearity for the Rb concentration of 5 mol % is probably due to an aggregation of Rb molecules in the film. Meanwhile, as shown in FIG. 13, positive MFEs were observed for fluorescence from the films both with and without Rb under UV irradiation.

According to the fact that curve shapes of positive and negative MFEs and their $B_{1/2}$ values are almost exactly the same (FIG. 4b and Extended Data FIGS. 8 and 9), similar interactions governing spin conversion may be involved. However, the population of the spin states is considered to be different from each other. In the fluorescence process, electron transfer from the excited donor molecules generated by UV irradiation is the main pathway for formation of emissive singlet CT ($^1$CT) excited states (FIG. 4c). Since the singlet charge-separated state ($^1$CSS) remains more populated than the triplet state ($^3$CSS$_{0,\pm}$) under continuous excitation, Zeeman splitting of the triplet sublevels by magnetic fields would inhibit intersystem crossing (ISC) from $^1$CSS to $^3$CSS$_\pm$, resulting in the increase of fluorescence intensity. Such a positive MFE was seen for the so-called magnetophotoluminescence behavior in OLEDs, and can be interpreted in terms of hyperfine interaction and/or Δg mechanisms.[29,30] On the other hand, negative MFEs in the LPL and PSL processes cannot be explained by the inhibition of forward ISC.

In organic LPL materials, a number of CSSs are stored in the film under and after pre-excitation (Extended Data FIGS. 5a-c). The spin distribution progresses to a 1:3 equilibrium based on spin statistics when spin mixing effectively occurs within the lifetime of spin-correlated CSSs (FIG. 4c). In the presence of external magnetic fields of approximately 10 mT, Zeeman splitting suppresses the population flow from $^3$CSS$_\pm$ to $^1$CSS via spin mixing, resulting in the decrease of LPL intensity. It has been reported that triplets accumulated inside the OLED devices possess long lifetimes while keeping their spin states, resulting in negative MFEs,[32] which are quite similar to our case. As demonstrated in FIG. 4b and FIG. 13c, increased Rb concentrations led to increases in the absolute values of $\chi_{LPL/FL}(B)$. This result implies that the trap/emitter molecules effectively trap the electrons to form long-distance CSSs with negligible exchange interactions (FIG. 1b).[33,34] From the density (1.34±0.1 g cm$^{-3}$) and molecular weight (584.6 mol g$^{-1}$) of PPT, a mean distance between m-MTDATA and trap/emitter molecules of 1 mol % can be roughly estimated to be approximately 3 nm, which matches the range (>1 nm) expected from the MFE results, taking its distribution into consideration. In addition to the trap/emitter molecules, the long lifetime of CSSs may be partly attributed to inherent trap sites (including structural disorders and impurities that are difficult to remove) in the m-MTDATA/PPT film.

EXPERIMENTAL SECTION

Materials m-MTDATA was obtained from Sigma-Aldrich. PPT was synthesized according to literature.[37] The predicted density of PPT using Advanced Chemistry Development (ACD/Labs) software was taken from SciFinder for calculation of molecular distance. Rb, TBPe, TTPA, TBRb, and DCM2 were obtained from Luminescence Technology Corp. All compounds were purified by sublimation and stored in an argon-filled glovebox.

Sample fabrication. The ternary blend films were prepared by reported procedures.[15] Briefly, m-MTDATA (1 mol %), PPT (98 mol %), and trap/emitter molecules (1 mol %, unless otherwise noted) were dissolved in dichloromethane. Then, the solvent was removed under reduced pressure in the dark. The mixture was dried using three cycles of the freeze-pump method. In an argon-filled glove box, the dried mixture was placed on a glass plate and heated up to 250° C. for 10 s. After melting, the substrate was rapidly cooled down to room temperature and encapsulated using a cover glass and UV-cured epoxy resin (FIG. 2b). For low temperature experiments, a quartz glass tube containing a mixture of m-MTDATA (1 mol %), PPT (98 mol %), and Rb (1 mol %) was evacuated under vacuum at room temperature and then heated up to 250° C. to melt the mixture. After cooling down to room temperature, the sample tube was inserted into a transparent glass Dewar vessel. The vessel was filled with liquid nitrogen for emission measurements at 77 K.

Characterizations

To observe PSL, the sample was excited by monochromatic NIR light (e.g., 800 nm, 12 mW cm$^{-2}$ at the sample) emitted from a Xe lamp (Asahi Spectra, MAX-303) with a bandpass filter, after stopping UV light irradiation (365 nm, 35 mW cm$^{-2}$ at the sample) using an LED light source (Thorlabs, M365LP1). Before repeated experiments, the sample was exposed to intense NIR light (750-1050 nm) from the Xe lamp for 10 min to remove as many long-lived trapped electrons as possible. The optical absorption spectra were obtained using UV-vis-NIR spectrophotometer (JASCO, V-770). The transient emission decay profile was obtained using a streak camera system (C10910). The sample was excited by a 355-nm pulse laser (PL2210, Ekspla) at 10 Hz. The cyclic voltammetry (CV) was carried out using an electrochemical analyzer (BAS, Model 610E). The measurements were performed in dried and oxygen-free dichloromethane (CH$_2$Cl$_2$) or N,N-dimethylformamide (DMF) using 0.1 M tetrabutylammonium hexafluorophosphate (TBAPF$_6$) as a supporting electrolyte. A platinum fiber was used as a working electrode, glassy carbon as a counter electrode, and Ag/Ag$^+$ as a reference electrode. Redox potentials were referenced against ferrocene/ferrocenium (Fc/Fc). The highest occupied molecular orbital (HOMO) and LUMO energy levels were calculated according to the equations of $E_{HOMO\ or\ LUMO} = -E_{redox\ (vs.\ Fc/Fc+)} - 4.8$ eV.[38] The absorption spectra of radical anion or radical cation of the materials were obtained by UV-vis-NIR spectrophotometer (Shimadzu, UV-3600 Plus). Samples in dried and oxygen-free CH$_2$Cl$_2$ or DMF with 0.1 M TBAPF$_6$ were oxidized or reduced by the platinum mesh electrode through the use of an electrochemical analyzer (BAS, Model 610E).

Fluorescence Microscopy Measurements

The fluorescence microscopy measurements were performed on an inverted fluorescence microscope (Nikon, Ti-E). A 365-nm LED (Thoriabs, M365LP1; 0.85 W cm$^{-2}$ at the sample) was used to excite the sample through an objective lens (CFI Plan Apo λ 100×H, Nikon; NA (numerical aperture)=1.45). A 810-nm LED light source (Thorlabs, M810L3; 810 nm, 12 mW cm$^{-2}$ at the sample) was used for NIR stimulation. A Xe lamp (Asahi Spectra, MAX-303) and bandpass filters were used for NIR excitation with the same numbers of emitted photons to obtain the action spectrum. The NIR light was irradiated from above the sample. The emission from the sample was collected by the same objective lens, after which it was magnified by a 1.5× built-in magnification changer. It subsequently passed through a dichroic mirror (Semrock, FF697-SDI01 or Di02-R405) and a shortpass filter (Semrock, FF02-694/SP-25) or a longpass filter (Semrock, BLP01-405R) to remove the undesired scattered light. The emission images were recorded with an electron-multiplying charge-coupled device camera (Roper Scientific, Evolve 512) using Micro-Manager (https://www-.micro-manager.org/). For the spectroscopy, only the emission that passed through a long-pass filter (Semrock, BLP01-405R) and a slit entered the imaging spectrograph (SOL instruments, MS3504i) equipped with a CCD camera (Andor, DU416A-LDC-DD). Magnetic fields were applied using a custom-made electromagnet and calibrated with a gauss meter. All experimental data were obtained at room temperature unless otherwise noted.

Supplementary Results

Fluorescence and LPL Measurements.

Figure 6:
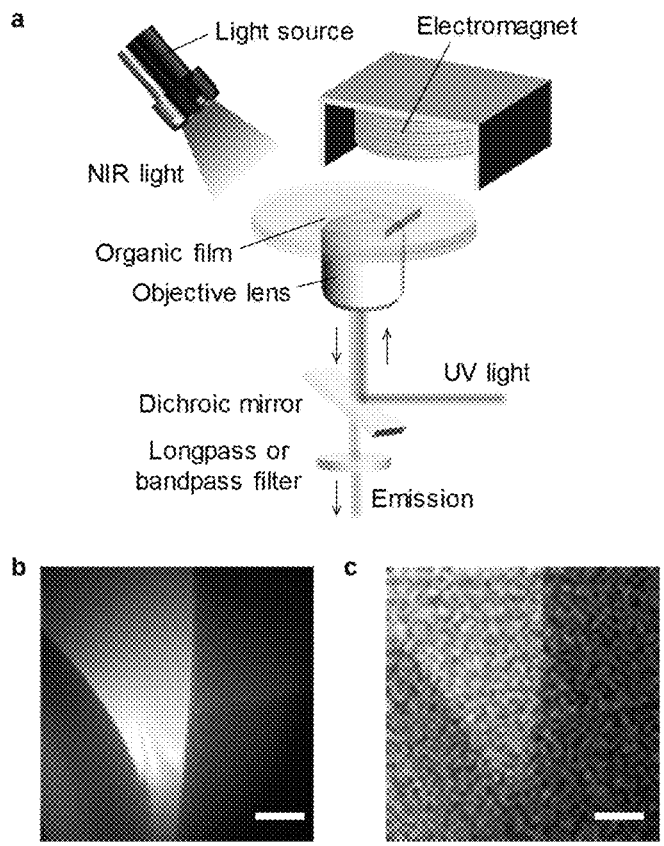
FIG. 6. Fluorescence microscopy measurements. a, Experimental setup based on inverted fluorescence microscope. The NIR light and magnetic fields were applied from above the sample. b, Fluorescence image observed for the m-MTDATA/PPT/Rb film under 365-nm light irradiation. c, LPL image observed for the m-MTDATA/PPT/Rb film at 10 s after stopping 365-nm light irradiation. The scale bars are 10 μm. The uniformly emitting regions without apparent structural disorders were selected for analysis.
Figure 7:
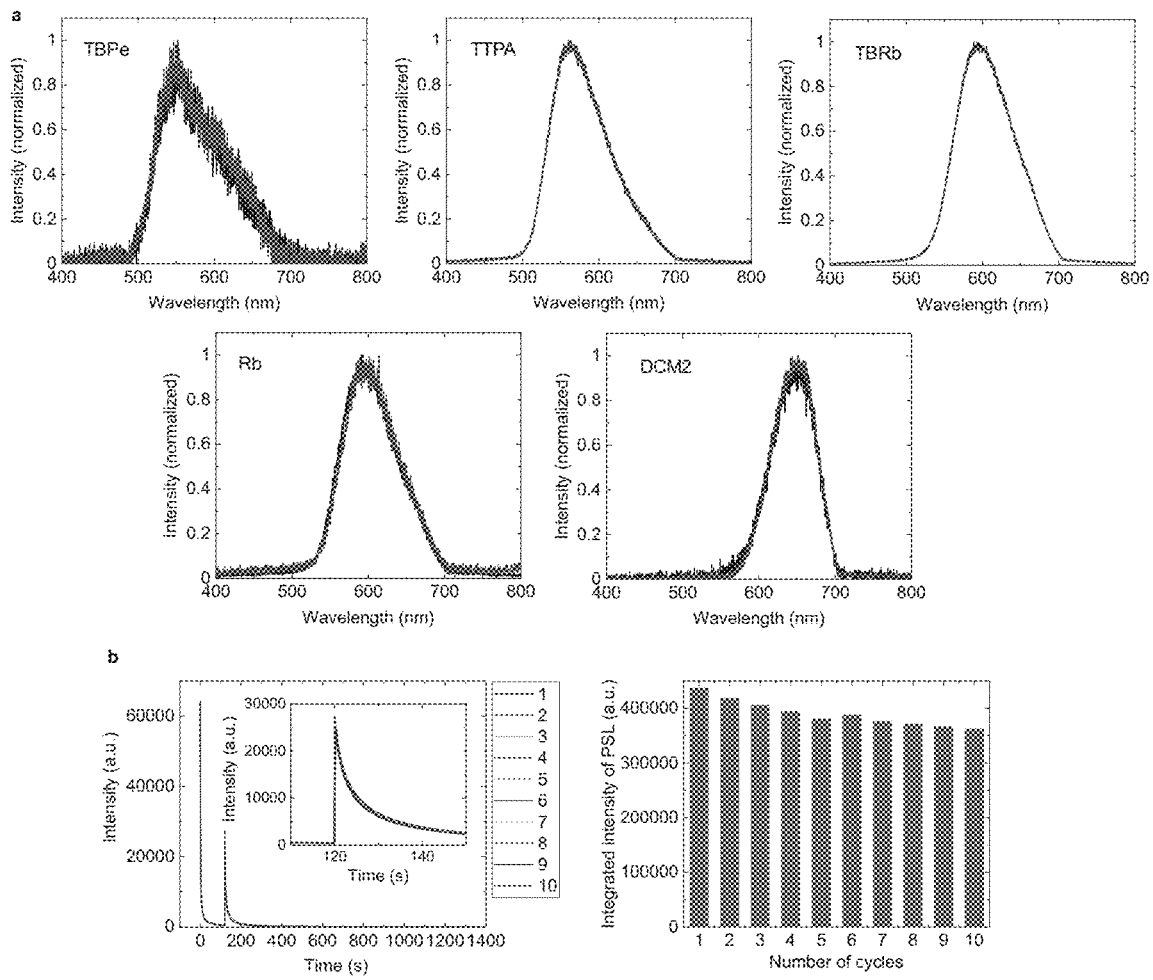
FIG. 7. Emission characteristics of the films. a, Normalized emission spectra of the m-MTDATA/PPT films containing 1 mol % trap/emitter molecules (Rb, TBPe, TTPA, TBRb, or DCM2) without (black line) and with (red line) NIR irradiation. Prior to the measurements using fluorescence microscopy, the sample was excited by UV light to accumulate the charges. The wavelengths of UV and NIR light were 365 nm and 810 nm, respectively. Note that the blue (~500 nm) and red (~700 nm) edges of the spectra were removed by the shortpass filter and dichroic mirror, respectively. b, Time traces of emission intensity (left) and changes of PSL intensity integrated over a period of 20 min (right) obtained from 10 repeated experiments. The inset in the left panel shows the initial time profiles of PSL. First, the sample was exposed to 365-nm light for 60 s. After being kept in the dark for 2 min, the sample was exposed to 800-nm light for 20 min, followed by a cooling in the dark for 10 min. This cycle was repeated 10 times.

FIG. 6 shows a part of the experimental setup and typical fluorescence and LPL images observed for the m-MTDATA/PPT/Rb film. The interface between the bright and dim regions indicate the boundaries in the film.

The normalized emission spectra of the films containing m-MTDATA, PPT, and trap/emitter molecules (1 mol %) without (black line) and with (red line) NIR irradiation (λ=810 nm) after stopping 365-nm light irradiation are shown in FIG. 7a. There was no significant spectral change, indicating that emission is from the trap/emitter molecules in both LPL and PSL processes.

The repeatability of PSL phenomenon was tested using the m-MTDATA/PPT/Rb film. As shown in FIG. 7b, the initial PSL intensity at 120 s (left panel) and integrated intensity over a period of 20 min (right panel) decreased by approximately 10% and 17%, respectively, after experiencing 10 write-in/readout cycles. This decrease is probably due to photodegradation of the sample under long-time light irradiation, because the LPL intensity observed just before the NIR stimulation also decreased.

The NIR-induced enhancement of LPL strongly depends on the excitation wavelength. Thus, the intensity changes are plotted as a function of excitation wavelength. Here, the numbers of incident photons to the sample are the same at each wavelength. As shown in FIG. 9d, the obtained action spectrum roughly matched with the absorption spectrum of Rb$^{\bullet-}$ (see FIG. 2e, FIG. 8b, and literature[1]). The PSL of the m-MTDATA/PPT film might be attributed to shallowly trapped electrons at PPT or impurities.

As shown in FIG. 11, strong PSL was observed for the m-MTDATA/PPT/Rb film at 77 K rather than at room temperature. This result is possibly due to a higher concentration of trapped electrons.

Time Tracking of Long-Lived Radicals.

The absorption spectra of the radicals were measured by spectroelectrochemistry at different applied potentials determined from cyclic voltammetry experiments (FIG. 8).

To confirm whether m-MTDATA$^{\bullet+}$ exists for a long time even after UV irradiation was stopped, temporal changes of absorbance changes were monitored. As shown in FIG. 9a, an increase in absorbance was observed during UV irradiation (20 to 250 s), and the absorbance gradually decreased after the UV irradiation was stopped (250 to 1,000 s). In the absence of Rb (i.e., the m-MTDATA (1 mol %)/PPT (99 mol %) film), the lifetime of m-MTDATA$^{\bullet+}$ after stopping UV irradiation clearly decreased, indicating that Rb molecules suppress charge recombination by trapping electrons from PPT$^{\bullet-}$ (FIG. 9b). The half-lives of m-MTDATA$^{\bullet+}$ were determined to be 88 s and 36 s with and without Rb (1 mol %), respectively.

FIG. 9c displays the time tracking of Rb$^{\bullet-}$ observed at 740 nm. Although the overall behavior seems to be similar to that found at 1100 nm in FIG. 9a, sharp decrease and increase were observed immediately after UV light was turned on and off, respectively. The sharp decrease is due to excitation of remaining Rb·− in the steady-state condition by UV light, leading to detrapping, because Rb·− can absorb 365-nm light.[39] On the other hand, the sharp increase is attributed to the formation of Rb·− by electron transfer from PPT·− to neutral Rb molecules, which were produced upon stopping UV light irradiation. The concentration of accumulated Rb·− in the film with a thickness of approximately 1 mm after UV light irradiation for 180 s was estimated to be approximately 15 μM, which is much lower than the concentration (approximately 23 mM) of Rb added.

Esr Spectra.

To examine which magnetic interactions are responsible for the field-sensitive LPL and to confirm whether the detrapping of Rb·− is caused by NIR irradiation or not, X-band ESR spectra of the m-MTDATA/PPT/Rb film were measured using a Bruker EMX spectrometer. The black line in FIG. 10a is the ESR spectrum measured in the dark, indicating the existence of long-lived radical species. The asymmetric ESR lineshape would be due to the overlapping of a species with a sharp ESR line shape shown in FIG. 10b, as a minor contribution. The major broad ESR line exhibits the g-factor of g=2.00358 from the center field with the line width of approximately 1.1 mT. The cause of this broad width is attributed to the hyperfine interaction often observed for long lived aromatic radical species containing nitrogen atoms under dark conditions such as oxidized spiro-OMeTAD molecule.[40,41] This hyperfine interaction was also inferred from $B_{1/2}$ obtained in the MFE measurements, as described later. g=2.00358 is slightly larger than the g-factors of aromatic hydrocarbon radicals. This is explained by the heavy atom effect of nitrogen. Therefore, the observed broad spectrum is assigned to m-MTDATA·+. The red line shows the spectrum under 365-nm light irradiation. The signal intensity significantly increased concomitant with an appearance of a new sharp peak. These results are attributed to the generation of additional radical species together with the increase in m-MTDATA·+ by the light. When UV and NIR light were simultaneously irradiated to the sample, slight intensity decrease and shape change were obtained (blue line). These differences would be attributed to the neutralization of Rb·− by photo-induced detrapping, because g value (2.00245) of differential spectrum (FIG. 10b) is in good agreement with the theoretical value (2.00235) for Rb·− obtained by Gaussian 09. The theoretical g value of Rb·− was obtained by using density functional theory (DFT) calculation with the B3LYP functional and 6-31+G(d, p) basis set. The calculated g-tensor principal values were $g_{xx}$=2.00162, $g_{yy}$=2.00271, and $g_{zz}$=2.00273. The line width of sharp peaks was 0.3 mT in FIG. 10b. The $B_{1/2}$ of the MFE in the hyperfine coupling (HFC) mechanism is empirically calculated by the following formula.[42]

$$B_{1/2} = \frac{Z(B_{Ra\bullet}^2 + B_{Rb\bullet}^2)}{B_{Ra\bullet} + B_{Rb\bullet}} \quad (S1)$$

Here, $B_{Ra\bullet}$ and $B_{Rb\bullet}$ represent the HFC constant of each radical. By applying $B_{Ra\bullet}$=0.3 mT and $B_{Rb\bullet}$=1.1 mT from the linewidths of the sharp and broad ESR spectra in FIG. 10b, $B_{1/2}$=1.9 mT was obtained. The magnetic field effect on reaction yield (MARY) curves on LPL and fluorescence shown in FIG. 4b and FIG. 13b, respectively, exhibited the $B_{1/2}$ value of approximately 3 mT, which was in good agreement with the $B_{1/2}$ value obtained from the ESR linewidths. This demonstrates that the singlet-triplet spin conversions of the highly separated, long-lived radical pairs of m-MTDATA·+ . . . Rb·− are involved in the present LPL, as detailed in the following sections.

MFEs on LPL.

FIG. 12a shows the MFEs on the LPL decay profiles of the m-MTDATA/PPT/Rb (1 mol %) film with and without NIR irradiation (B=0.6-30 mT). The $\chi_{LPL}$(B) values were similar for both conditions, indicating that MFEs on LPL and PSL can be described by basically the same mechanism.

FIG. 12b shows the LPL decay profiles of the m-MTDATA/PPT/Rb (0.1 mol %) films measured while modulating the magnetic fields after stopping UV irradiation. Significant MFEs were observed only for the films with Rb.

FIG. 12c shows the Rb concentration dependence of the MARY spectra in which the $\chi_{LPL}$(B) values are plotted at each magnetic field. The saturation absolute values of $\chi_{LPL}$(B) increased with increasing Rb concentration, while the $B_{1/2}$ values (i.e., the magnetic field at which the change in emission intensity reaches half of its saturation value) remained constant.

MFEs on Fluorescence.

FIG. 13a shows the changes in the fluorescence intensity observed for the m-MTDATA/PPT/Rb blend film at each magnetic field. Unlike the negative MFEs in the LPL and PSL processes, positive MFEs were clearly observed. FIG. 13b also represents the Rb concentration dependence of the MARY spectra in which the $\chi_{FL}$(B) values are plotted at each magnetic field using the following equation.

$$\chi_{FL}(B) = \frac{\Delta FL}{FL} = \frac{FL(B, t) - FL(0, t)}{FL(0, t)} \times 100 \quad (S2)$$

where FL(0, t) and FL(B, t) represent the fluorescence intensity at each time in the presence and absence of external magnetic field, respectively. As demonstrated in FIG. 13c, the absolute saturated $\chi_{FL}$ values increased with increasing Rb concentration, and the $B_{1/2}$ values were almost identical among the samples and very close to those in the LPL process.

Another Example of the Invention

Figure 14:
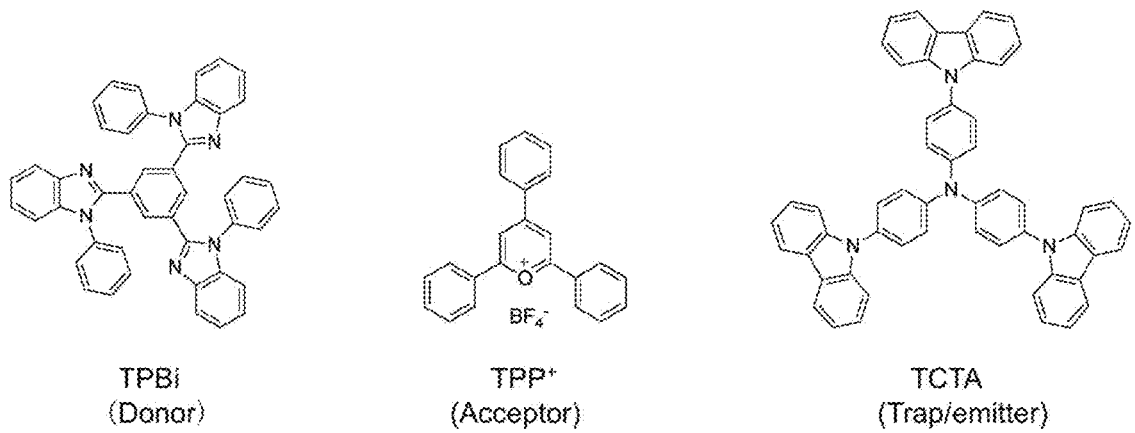
FIG. 14. Chemical structures of TPP$^+$, TPBi, and TCTA.

In a nitrogen-filled glovebox, mixtures of TPP+, TPBi, and TCTA (1:99:1) shown in FIG. 14 were placed on a template glass substrate with a 100-mm² surface area, 0.5-mm depth, and heated to 300° C. for 10 seconds. After melting, the substrate was cooled rapidly to room temperature.

The LPL spectra and decay profiles were obtained using a measurement system in a glove box. The fabricated films were placed in a dark box and excited by a 365-nm LED with bandpass filter, an excitation power of 1 mWcm⁻², and an excitation duration of 300 seconds. The PL and LPL spectra were recorded using a multichannel spectrometer (PMA-12, Hamamatsu Photonics). After the initial photoexcitation, the sample was photo stimulated by a 850-nm LED.

Figure 15:
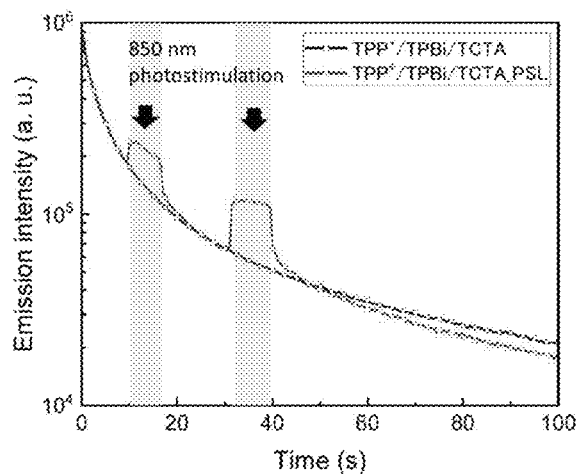
FIG. 15. a, Emission decay profiles of a TPP$^+$/TPBi/TCTA film with/without photostimulation at 850 nm. The mixed film was photostimulated at 10 s and 32 s after the initial photoexcitation. Emission intensity were integrated from 500 nm to 700 nm. b, Emission spectra of the TPP$^+$/TPBi/TCTA film with/without photostimulation.
Figure 15:
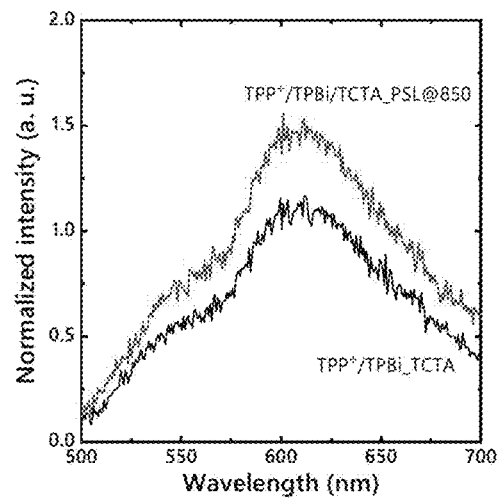

FIG. 15 (a) shows emission decay profiles of a TPP+/TPBi/TCTA film with/without photostimulation at 850 nm. The mixed film was photostimulated at 10 s and 32 s after the initial photoexcitation. Emission intensity were integrated from 500 nm to 700 nm. FIG. 15 (b) shows emission spectra of the TPP+/TPBi/TCTA film with/without photostimulation.

Figure 16:
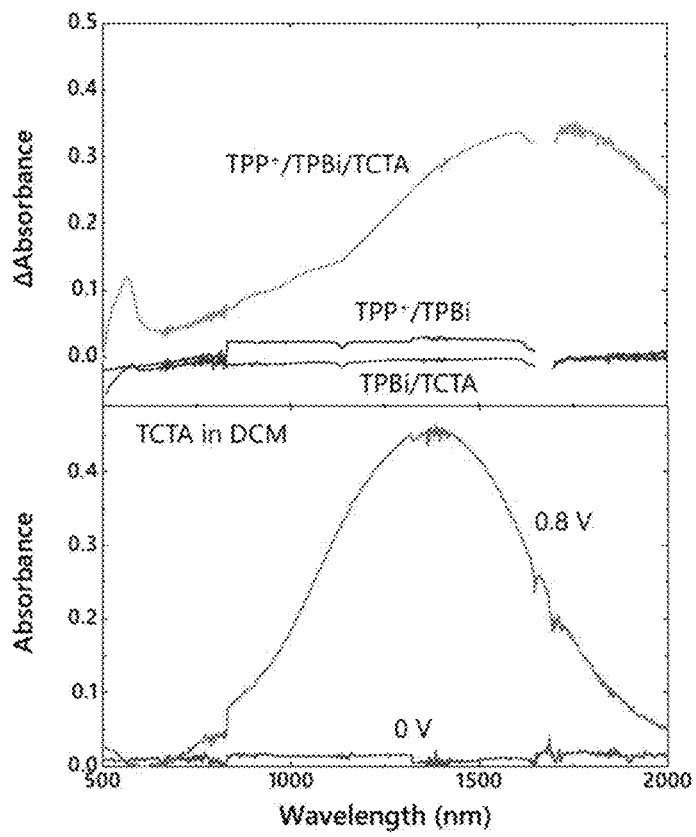
FIG. 16. Top, Delta absorption spectra of TPP$^+$/TPBi, TPP$^+$/TPBi/TCTA, and TPBi/TCTA films before and after photoexcitation (300 K, under $N_2$). Bottom, Absorption spectra of TCTA in DCM that contained 0.1 M TBAPF$_6$ with and without electrical oxidation (300 K, under $N_2$). Absorption data at 1650-1700-nm omitted because of the quartz substrate absorption.

FIG. 16 (Top) shows delta absorption spectra of TPP$^+$/TPBi, TPP$^+$/TPBi/TCTA, and TPBi/TCTA films before and after photoexcitation (300 K, under N$_2$). FIG. 16 (Bottom) shows absorption spectra of TCTA in DCM that contained 0.1 M TBAPF$_6$ with and without electrical oxidation (300 K, under N$_2$). Absorption data at 1650-1700-nm omitted because of the quartz substrate absorption.

The invention claimed is:

1. A composition comprising an electron donor, an electron acceptor and a third component, wherein:
   a combination of the electron donor and the electron acceptor is selected from combinations that exhibit luminescence from an exciplex formed by the electron donor and the electron acceptor with a duration time of 0.1 seconds or longer upon an excitation at 10K,
   the third component is selected from materials with capabilities that receive an electron and then release an electron upon a photostimulation and materials with capabilities that receive a hole and then release a hole upon a photostimulation, and
   the composition exhibits luminescence from the exciplex upon an excitation.

2. The composition according to claim 1, wherein the photostimulation is near infrared light irradiation.

3. A method for using the composition according to claim 1 for imaging, marking, optical data storage, optical sensing, optical energy conversion and security seals.

4. An organic photostimulated luminescent device comprising a composition, wherein:
   the composition comprises an electron donor, an electron acceptor and a third component,
   a combination of the electron donor and the electron acceptor is selected from combinations that exhibit luminescence from an exciplex formed by the electron donor and the electron acceptor with a duration time of 0.1 seconds or longer upon an excitation at 10K,
   the third component is selected from materials with capabilities that receive an electron and then release an electron upon a photostimulation and materials with capabilities that receive a hole and then release a hole upon a photostimulation, and
   the device causes the composition to exhibit luminescence from the exciplex by irradiating the composition with light for photostimulation.

5. A luminescent method by photostimulation, comprising:
   exciting a composition, and
   photostimulating the composition to exhibit luminescence, wherein:
   the composition comprises an electron donor, an electron acceptor and a third component,
   a combination of the electron donor and the electron acceptor is selected from combinations that exhibit luminescence from an exciplex formed by the electron donor and the electron acceptor with a duration time of 0.1 seconds or longer upon an excitation at 10K,
   the third component is selected from materials with capabilities that receive an electron and then release an electron upon a photostimulation and materials with capabilities that receive a hole and then release a hole upon a photostimulation, and
   the composition exhibits luminescence from the exciplex upon photostimulation.

6. The luminescent method by photostimulation according to claim 5, satisfying the following [1] or [2]:
   [1]
   an electron is transferred from the electron donor to the electron acceptor by the excitation to generate an electron donor in a radical cation state and an electron acceptor in a radical anion state,
   an electron of the electron acceptor in a radical anion state is trapped by the third component,
   the trapped electron on the third component is detrapped and transferred to an electron acceptor by a photostimulation to generate an electron acceptor in a radical anion state, and
   the detrapped electron of the electron acceptor in a radical anion state is recombined with a hole of the electron donor in a radical cation state whereby an exciplex of the electron donor and the electron acceptor is generated to cause luminescence, or
   [2]
   an electron is transferred from the electron donor to the electron acceptor by the excitation to generate an electron donor in a radical cation state and an electron acceptor in a radical anion state,
   a hole of the electron donor in a radical cation state is trapped by the third component,
   the trapped hole on the third component is detrapped and transferred to an electron donor by a photostimulation to generate an electron donor in a radical cation state, and
   the detrapped hole of the electron donor in a radical cation state is recombined with an electron of the electron acceptor in a radical anion state whereby an exciplex of the electron donor and the electron acceptor is generated to cause luminescence.

7. The luminescent method by photostimulation according to claim 5, further comprising applying a magnetic field to the composition to control intensity of the luminescence upon the photostimulation.

8. A method for designing a composition for photostimulated luminescence comprising:
   1) Evaluating photostimulated luminescence of a composition comprising an electron donor, an electron acceptor and a third component, wherein:
   a combination of the electron donor and the electron acceptor is selected from combinations that exhibit luminescence from an exciplex formed by the electron donor and the electron acceptor with a duration time of 0.1 seconds or longer upon an excitation at 10K, and
   the third component is selected from materials with capabilities that receive an electron and then release an electron upon a photostimulation and materials with capabilities that receive a hole and then release a hole upon a photostimulation, and
   2) Modifying at least one of the electron donor, the electron acceptor and the third component to so design a new composition as to improve photostimulated luminescence.

* * * * *